United States Patent
Hsueh et al.

(10) Patent No.: US 9,383,556 B2
(45) Date of Patent: Jul. 5, 2016

(54) OPTICAL LENS SYSTEM, IMAGING DEVICE AND ELECTRONIC DEVICE

(71) Applicant: LARGAN PRECISION CO., LTD., Taichung (TW)

(72) Inventors: Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 175 days.

(21) Appl. No.: 14/290,963

(22) Filed: May 29, 2014

(65) Prior Publication Data
US 2015/0286032 A1 Oct. 8, 2015

(30) Foreign Application Priority Data
Apr. 8, 2014 (TW) .............................. 103112809 A

(51) Int. Cl.
*G02B 13/18* (2006.01)
*G02B 9/34* (2006.01)
*G02B 13/00* (2006.01)
*H04N 5/225* (2006.01)

(52) U.S. Cl.
CPC ................ *G02B 13/008* (2013.01); *G02B 9/34* (2013.01); *G02B 13/004* (2013.01); *G02B 13/18* (2013.01); *H04N 5/2253* (2013.01); *H04N 5/2254* (2013.01)

(58) Field of Classification Search
CPC .............. G02B 9/00; G02B 9/04; G02B 9/06; G02B 9/08; G02B 9/34; G02B 9/56; G02B 13/00; G02B 13/001; G02B 13/0015; G02B 13/002; G02B 13/004; G02B 13/008; G02B 13/18

See application file for complete search history.

(56) References Cited

U.S. PATENT DOCUMENTS

| 7,633,690 B2 * | 12/2009 | Yasuhiko | G02B 13/004 359/715 |
| 2012/0113310 A1 * | 5/2012 | Huang | G02B 9/34 348/340 |
| 2013/0308209 A1 * | 11/2013 | Baba | G02B 13/004 359/780 |

FOREIGN PATENT DOCUMENTS

JP 2005265950 A 9/2005

* cited by examiner

*Primary Examiner* — Thong Nguyen
(74) *Attorney, Agent, or Firm* — Banger Shia

(57) ABSTRACT

An optical lens system comprises, in order from an object side to an image side, a first lens element, a second lens element, a third lens element, and a fourth lens element. The first lens element with positive refractive power has an object-side surface being convex in a paraxial region. The second lens element with refractive power has an image-side surface being convex in a paraxial region. The third lens element with positive refractive power has an aspheric object-side surface being concave in a paraxial region and an aspheric image-side surface being convex in a paraxial region. The fourth lens element with refractive power has an aspheric object-side surface being concave in a paraxial region and an aspheric image-side surface being convex in a paraxial region. There are a total of four lens elements with refractive power in the optical lens system.

19 Claims, 19 Drawing Sheets

OPTICAL LENS SYSTEM, IMAGING DEVICE AND ELECTRONIC DEVICE

BACKGROUND

1. Technical Field

The present disclosure relates to an optical lens system, imaging device and electronic device. More particularly, the present disclosure relates to a compact optical lens system and imaging device applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of image sensors to be reduced and compact, optical systems have gradually evolved toward the field of higher megapixels, there is an increasing demand for compact optical systems featuring better image quality.

A conventional compact optical system in a portable electronic product typically utilizes a three-element lens structure. Due to the popularity of electronic products with high-end specifications, such as smart TVs, wireless monitoring devices, motion sensing input devices and other high-end electronic devices, the requirements for high resolution and image quality of present compact optical systems increase significantly. However, the conventional optical systems cannot satisfy these requirements of the compact optical systems.

Another conventional compact optical system provides a four-element lens structure. When the first lens element of the optical system cannot provide sufficient refractive power with higher refractive power distributed among the second, third and fourth lens elements, it is not favorable for correcting peripheral aberrations within the optical system, expanding the surrounding light cone size, and improving the peripheral resolution and relative illumination. Especially when the image-side surface of the fourth lens element is concave, the incident angle of the off axis light with respect to the image sensor cannot be effectively suppressed, which reduces the responding efficiency of the image sensor and is not suitable for infrared optical system.

SUMMARY

The primary objective of the present disclosure is to mitigate and/or obviate the afore-mentioned disadvantages by providing an optical lens system comprising a first lens element for supplying the majority of refractive power in the optical lens system accompanied by the second, third, and fourth lens elements with weaker refractive power, to correct peripheral aberrations within the optical lens system, expand the surrounding light cone size, and improve the peripheral resolution and relative illumination.

Additionally, by providing an optical lens system with the fourth lens element further having an object-side surface being concave in a paraxial region and an image-side surface being convex in a paraxial region, the incident angle of the off off-axis light with respect to the image sensor can be effectively suppressed, which is favorable for improving the responding efficiency of the image sensor, particularly in infrared optical systems.

According to one aspect of the present disclosure, an optical lens system comprises, in order from an object side to an image side, a first lens element with positive refractive power having an object-side surface being convex in a paraxial region, a second lens element having an image-side surface being convex in a paraxial region, a third lens element with positive refractive power having an aspheric object-side surface being concave in a paraxial region and an aspheric image-side surface being convex in a paraxial region, a fourth lens element having an aspheric object-side surface being concave in a paraxial region and an aspheric image-side surface being convex in a paraxial region. The optical lens system has a total of four non-cemented lens elements with refractive power. When a focal length of the first lens element is f1, a focal length of the second lens element is f2, a focal length of the third lens element is f3, a focal length of the fourth lens element is f4, a curvature radius of the object-side surface of the third lens element is R5, and a curvature radius of the image-side surface of the third lens element is R6, the following conditions are satisfied:

$|f1/f2|+|f1/f3|+|f1/f4|<1.80$; and $0<R5/R6<20$.

According to another aspect of the present disclosure, an imaging device includes the optical lens system according to the aforementioned aspect and an image sensor, wherein the image sensor is disposed on an image side of the optical lens system.

According to still another aspect of the present disclosure, an electronic device includes the imaging device according to the aforementioned aspect.

When $|f1/f2|+|f1/f3|+|f1/f4|$ satisfies the condition, it is favorable for adjusting the refractive power of the lens elements, so as to correct peripheral aberrations within the optical lens system, expand the surrounding light cone size, and improve the peripheral resolution and relative illumination.

When R5/R6 satisfies the condition, it is favorable for controlling the aberration of the optical lens system and improving the image quality.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
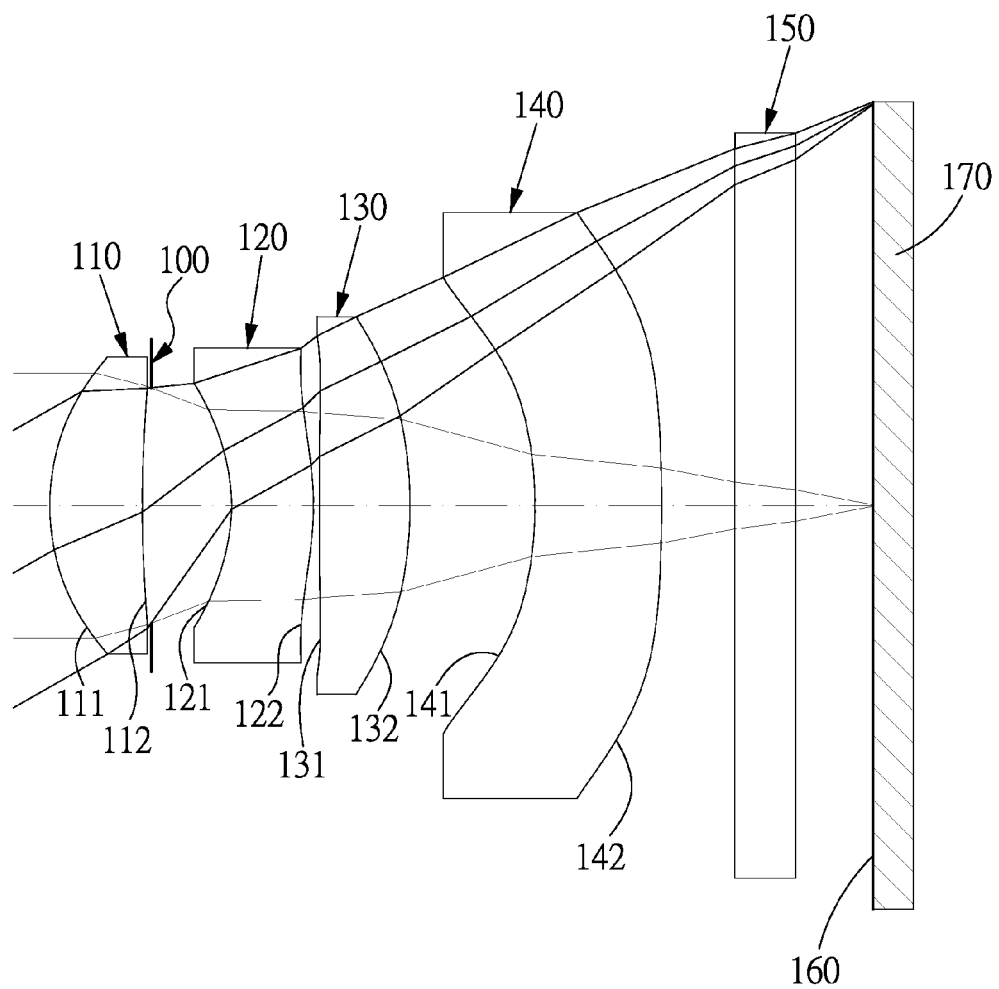
FIG. 1A is a schematic view of an imaging device according to the 1st embodiment of the present disclosure.

An optical lens system comprises, in order from an object side to an image side, a first lens element, a second lens element, a third lens element and a fourth lens element. The optical lens system has a total of four non-cemented lens elements with refractive power.

Each of the first through fourth lens elements is a single and non-cemented lens element. That is, any two lens elements adjacent to each other are not cemented, and there is space between the two lens elements. Moreover, the manufacturing process of the cemented lenses is more complex than the non-cemented lenses. In particular, a second surface of one lens element and a first surface of the following lens element need to have accurate curvature to ensure these two lens elements will be precisely matched when fitting by the cementing process. However, during the cementing process, those two lens elements might not be well cemented resulting in displacement between surfaces, and it is thereby not favorable in producing higher image quality of the optical lens system. Therefore, the optical lens system of the present disclosure provides four non-cemented lens elements for improving upon the problem generated by the cemented lens elements.

The first lens element with positive refractive power has an object-side surface being convex in a paraxial region. The first lens element is provided for supplying the majority of refractive power in the optical lens system accompanied by the second, third, and fourth lens elements with weaker refractive power, to correct peripheral aberrations within the optical lens system, expand the surrounding light cone size, and improve the peripheral resolution and relative illumination.

The second lens element with positive refractive power has an image-side surface being convex in a paraxial region, so that it is favorable for correcting the aberration of the optical lens system.

The third lens element with positive refractive power has an aspheric object-side surface being concave in a paraxial region and an aspheric image-side surface being convex in a paraxial region. Therefore, it is favorable for balancing the positive refractive power, preventing the excessive increase of spherical aberration caused by over-concentration of the refractive power, and correcting the astigmatism of the optical lens system.

The fourth lens element with negative refractive power has an aspheric object-side surface being concave in a paraxial region and an aspheric image-side surface being convex in a paraxial region. Therefore, it will contribute to a better correction of the incident angle of the off axis light with respect to the image sensor, and favorable for improving the responding efficiency of the image sensor, particularly in infrared optical systems.

According to the optical lens system of the present disclosure, one of the object-side and image-side surfaces of the fourth lens element has at least one inflection point. Therefore, it can further correcting the aberration of the off-axis.

According to the optical lens system of the present disclosure, a point of a maximum effective radius position on the image-side surface of the fourth lens element which is projected on the optical axis is located nearer an imaged object than an axial vertex on the object-side surface of the fourth lens element. Therefore, the peripheral surface shape of the image-side surface will be changed obviously and it is favorable for further correcting peripheral aberrations within the system When a focal length of the first lens element is f1, a focal length of the second lens element is f2, a focal length of the third lens element is f3, and a focal length of the fourth lens element is f4, the following condition is satisfied: $|f1/f2|+|f1/f3|+|f1/f4|<1.80$. Therefore, it is favorable for properly adjusting the refractive power of lens elements so as to correct peripheral aberrations within the optical lens system, expand the surrounding light cone size, and improve the peripheral resolution and relative illumination. Preferably, the following condition is satisfied: $0.50<|f1/f2|+|f1/f3|+|f1/f4|<1.50$ When a curvature radius of the object-side surface of the third lens element is R5, and a curvature radius of the image-side surface of the third lens element is R6, the following condition is satisfied: $0<R5/R6<20$. Therefore, it is favorable for reducing the aberration of the optical lens system so as to improve the image quality.

When a curvature radius of the object-side surface of the second lens element is R3, and a curvature radius of the image-side surface of the second lens element is R4, the following condition is satisfied: $R4/R3<2.0$. Therefore, it is favorable for correcting the aberration of the optical lens system.

When a central thickness of the fourth lens element is CT4, an axial distance between the first lens element and the second lens element is T12, the following condition is satisfied: $CT4/T12<1.0$. Therefore, it is favorable for arranging the fourth lens elements and reducing the total track length of the optical lens system.

When the curvature radius of the object-side surface of the third lens element is R5, and a curvature radius of the image-side surface of the fourth lens element is R8, the following condition is satisfied: $0<R5/R8<4.0$. Therefore, it is favorable for correcting the astigmatism of the optical lens system so as to improve the resolution of the optical lens system.

When the axial distance between the first lens element and the second lens element is T12, an axial distance between the second lens element and the third lens element is T23, and an axial distance between the third lens element and the fourth lens element is T34, T34>T12, and T34>T23. Therefore, it is favorable for controlling the back focal length of the optical lens system.

The optical lens system can be used in infrared wavelength range of 750 nm~1050 nm, which satisfies the photographing demand of a specific wavelength of light, and can detect infrared images at night in low light or can be applied to special applications, such as, motion capture and so on.

When the axial distance between the third lens element and the fourth lens element is T34, a focal length of the optical lens system is f, the following condition is satisfied: $0.10<T34/f<0.40$. Therefore, it is favorable for controlling the back focal length of the optical lens system and reducing the total track length of the optical lens system.

When the axial distance between the second lens element and the third lens element is T23, the axial distance between the third lens element and the fourth lens element is T34, the following condition is satisfied: $T23/T34<5.0$. Therefore, it is favorable for properly adjusting the axial distances between every pair of lens elements so as to facilitate the manufacture of the optical lens system.

When a central thickness of the second lens element is CT2, and a central thickness of the third lens element is CT3, the following condition is satisfied: $0.8<CT2/CT3<2.0$. Therefore, it is favorable for avoiding the lens elements with an excessively thin thickness or an excessively thick thickness. It is thereby favorable for manufacturing and assembling the lens elements of the optical lens system, and properly adjusting the total track length of the optical lens system.

When the focal length of the second lens element is f2, and the focal length of the third lens element is f3, the following condition is satisfied: $-1.0<f3/f2<0.6$. Therefore, the refractive power of the second and third lens elements will be more proper and it is favorable for correcting the aberration and astigmatism of the optical lens system. Preferably, the following condition is satisfied: $-0.7<f3/f2<0$.

Abbe numbers of at least two of the first, second, third and fourth lens elements are smaller than 32. Therefore, it is favorable for correcting the aberration of the optical lens system.

An incident angle between a chief ray and a normal line on an image plane at a maximum image height is CRA, the following condition is satisfied: $CRA<27.5$ degrees. Therefore, it will contribute to a better correction of the incident angle of the off axis light with respect to the sensor. It is thereby favorable for improving the responding efficiency of the image sensor, so as to improve the image quality.

According to the optical lens system of the present disclosure, the optical lens system further includes a stop, wherein the stop is disposed between the first lens element and the image plane. Therefore, it is favorable for enlarging the field of view of the optical lens system and thereby provides a wider field of view for the same. The stop can also be disposed between the imaged object and the first lens element, which can provide a longer distance between an exit pupil of the optical lens system and the image plane and thereby improves the image-sensing efficiency of an image sensor.

According to the optical lens system of the present disclosure, the lens elements thereof can be made of glass or plastic material. When the lens elements are made of glass material, the distribution of the refractive power of the optical lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical lens system can also be reduced.

According to the optical lens system of the present disclosure, the optical lens system can include at least one stop, such as an aperture stop, a glare stop or a field stop. The glare stop or the field stop is for eliminating the stray light and thereby improving the image resolution thereof.

According to the optical lens system of the present disclosure, each of an object-side surface in the paraxial region and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region; when the lens element has a concave surface, it indicates that the surface is concave in the paraxial region.

The present optical lens system can be optionally applied to moving focus optical systems. According to the optical lens system of the present disclosure, the optical lens system is featured with good correction ability and high image quality, and can be applied to 3D (three-dimensional) image capturing applications, in products such as digital cameras, mobile devices, digital tablets, wearable devices and other electronic devices.

According to the present disclosure, an imaging unit is provided. The imaging unit includes the optical lens system according to the aforementioned optical lens system of the present disclosure, and an image sensor, wherein the image sensor is disposed on the image side of the aforementioned optical lens system, that is, the image sensor can be disposed on or near an image plane of the aforementioned optical lens system. It is thereby favorable for obtaining large field of view for the imaging unit and keeping a compact size thereof. Preferably, the imaging unit can further include a barrel member, a holding member or a combination thereof.

According to the present disclosure, an electronic device is provided, wherein the electronic device includes the aforementioned imaging unit. Preferably, the electronic device can further include but not limited to display, control unit, random access memory unit (RAM), storage unit or a combination thereof.

Figure 10:
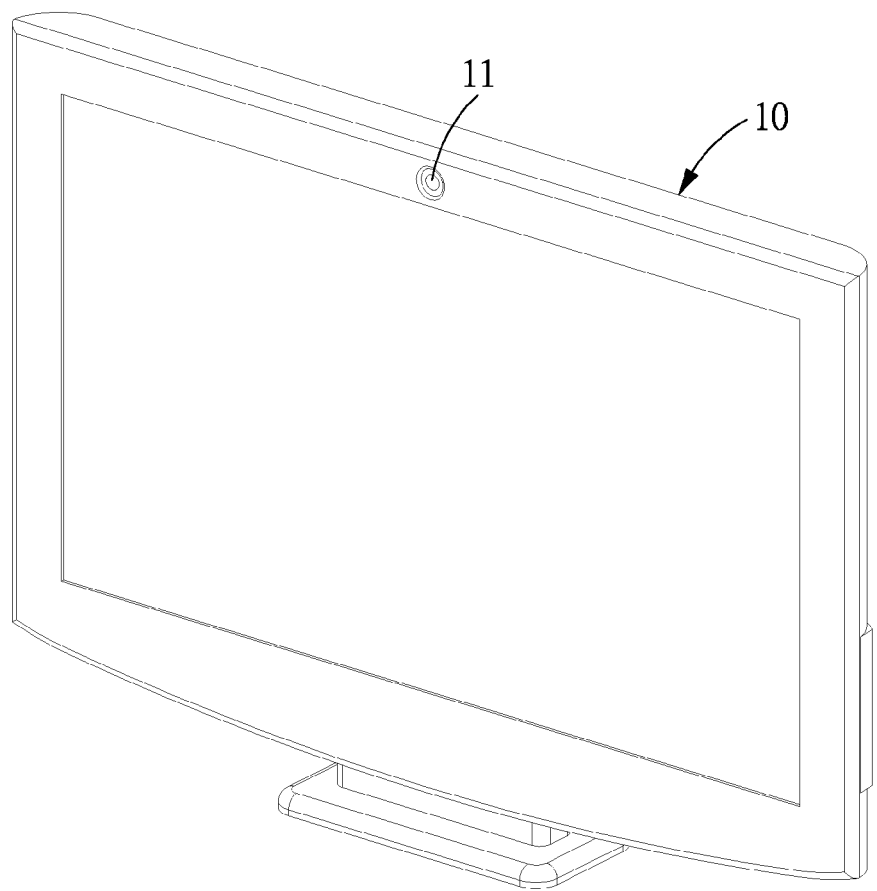
FIG. 10 shows an electronic device according to the 9th embodiment.
Figure 11:
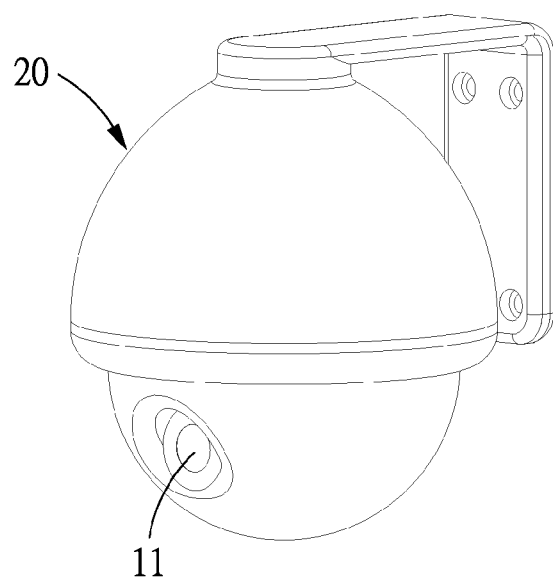
FIG. 11 shows an electronic device according to the 10th embodiment.
Figure 12:
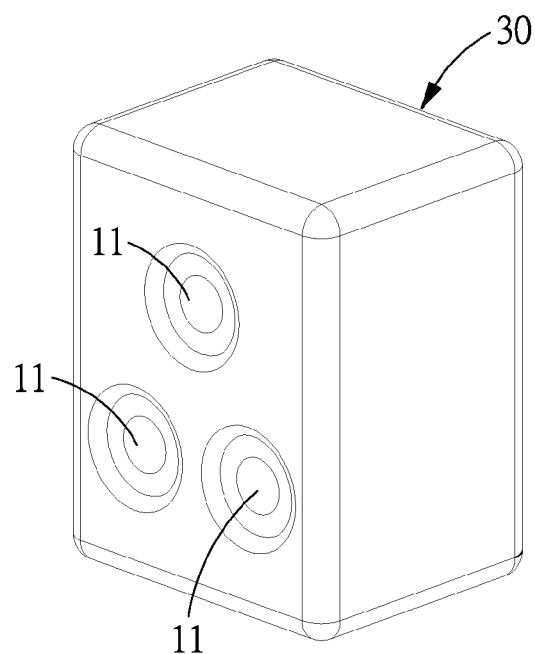
FIG. 12 shows an electronic device according to the 11th embodiment.

In FIG. 10, FIG. 11 and FIG. 12, an image unit 11 may be installed in, but not limited to, a smart TV 10 (FIG. 10), a wireless monitoring device 20 (FIG. 11) or a motion sensing input device 30 (FIG. 12). The three exemplary figures of different kinds of electronic devices are only exemplary for showing the imaging device 11 of present disclosure installed in an electronic device and are not limited thereto.

According to the above description of the present disclosure, the following 1st-11th specific embodiments are provided for further explanation.

1st Embodiment

Figure 1B:
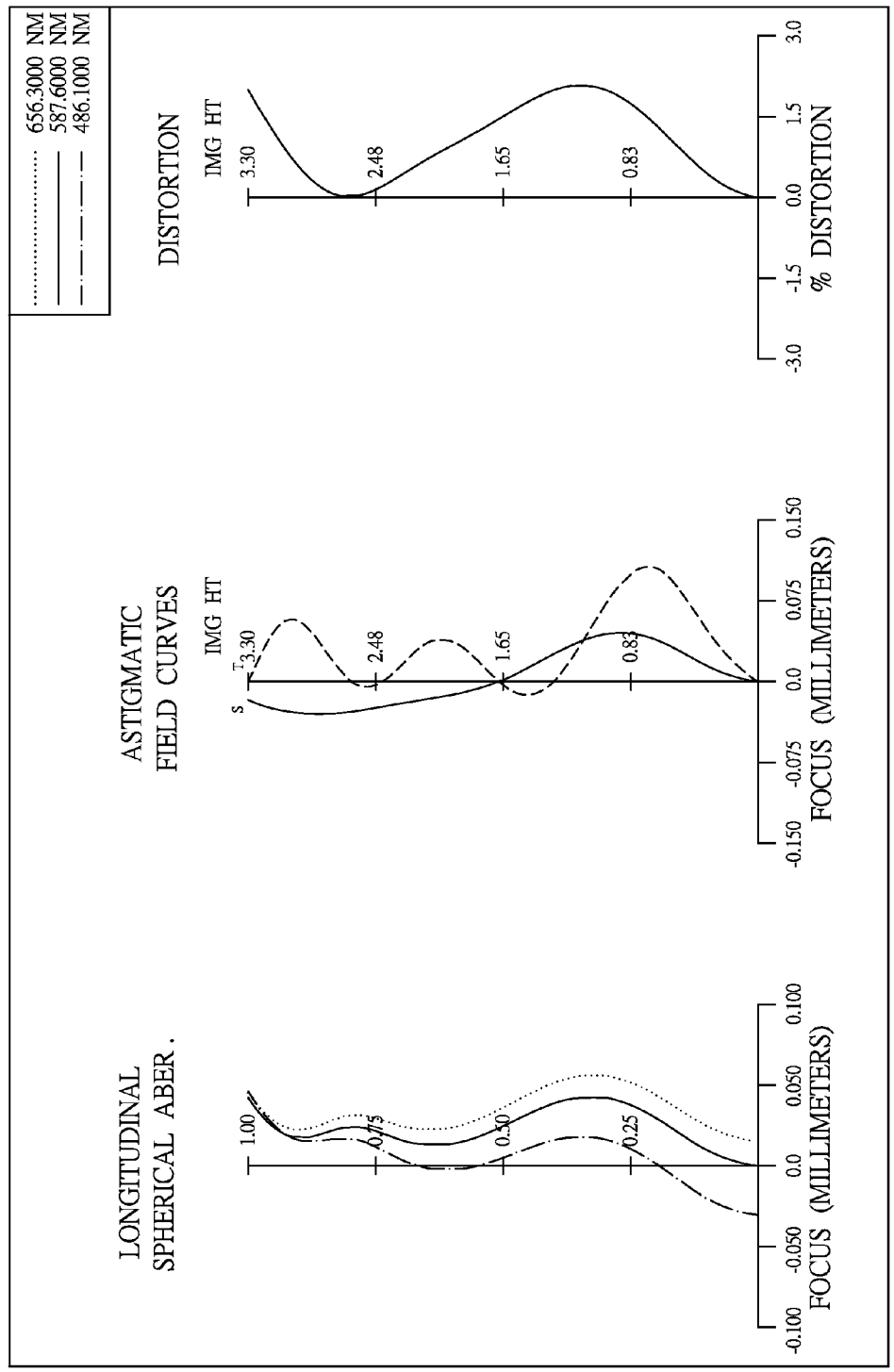
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging unit according to the 1st embodiment.

In FIG. 1A, the imaging device includes the optical lens system (not otherwise herein labeled) of the present disclosure and an image sensor 170. The optical lens system comprises, in order from an object side to an image side, a first lens element 110, an aperture stop 100, a second lens element 120, a third lens element 130, a fourth lens element 140, an IR-cut filter 150 and an image plane 160, wherein the optical lens system has a total of four non-cemented lens elements (110-140) with refractive power. In the optical lens system according to the 1st embodiment, Abbe numbers of the second lens element 120, the third lens element 130 and the fourth lens elements 140 are smaller than 32.

The first lens element 110 with positive refractive power has an aspheric object-side surface 111 being convex in a paraxial region and an aspheric image-side surface 112 being concave in a paraxial region, and the first lens element 110 is made of plastic material.

The second lens element 120 with negative refractive power has an aspheric object-side surface 121 being concave in a paraxial region and an aspheric image-side surface 122 being convex in a paraxial region, and the second lens element 120 is made of plastic material.

The third lens element 130 with positive refractive power has an aspheric object-side surface 131 being concave in a paraxial region and an aspheric image-side surface 132 being convex in a paraxial region, and the third lens element 130 is made of plastic material.

The fourth lens element 140 with negative refractive power has an aspheric object-side surface 141 being concave in a paraxial region and an aspheric image-side surface 142 being convex in a paraxial region, the fourth lens element 140 is made of plastic material, and inflection points are formed on the object-side surface 141 and the image-side surface 142 of the fourth lens element 140.

The IR-cut filter 150 is made of glass and located between the fourth lens element 140 and the image plane 160, and will not affect the focal length of the optical lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens system of the imaging device according to the 1st embodiment, when a focal length of the optical lens system is f, an f-number of the optical lens system is Fno, and half of a maximal field of view of the optical lens system is HFOV, these parameters have the following values: f=5.67 mm; Fno=2.60; and HFOV=29.7 degrees.

In the optical lens system of the imaging device according to the 1st embodiment, when a focal length of the first lens element 110 is f1, a focal length of the second lens element 120 is f2, a focal length of the third lens element 130 is f3, and a focal length of the fourth lens element 140 is f4, the following condition is satisfied: |f1/f2|+|f1/f3|+|f1/f4|=1.48.

In the optical lens system of the imaging device according to the 1st embodiment, when a curvature radius of the object-side surface 131 of the third lens element 130 is R5, and a curvature radius of the image-side surface 132 of the third lens element 130 is R6, the following condition is satisfied: R5/R6=7.35.

In the optical lens system of the imaging device according to the 1st embodiment, when a curvature radius of the object-side surface 121 of the second lens element 120 is R3, and a curvature radius of the image-side surface 122 of the second lens element 120 is R4, the following condition is satisfied: R4/R3=1.59.

In the optical lens system of the imaging device according to the 1st embodiment, when a central thickness of the fourth lens element 140 is CT4, and an axial distance between the first lens element 110 and the second lens element 120 is T12, the following condition is satisfied: CT4/T12=1.42.

In the optical lens system of the imaging device according to the 1st embodiment, when the curvature radius of the object-side surface 131 of the third lens element 130 is R5, and a curvature radius of the image-side surface 142 of the fourth lens element 140 is R8, the following condition is satisfied: R5/R8=2.71.

In the optical lens system of the imaging device according to the 1st embodiment, when an axial distance between the third lens element 130 and the fourth lens element 140 is T34, the focal length of the optical lens system is f, the following condition is satisfied: T34/f=0.18.

In the optical lens system of the imaging device according to the 1st embodiment, when an axial distance between the second lens element 120 and the third lens element 130 is T23, and the axial distance between the third lens element 130 and the fourth lens element 140 is T34, the following condition is satisfied: T23/T34=0.05.

In the optical lens system of the imaging device according to the 1st embodiment, when a central thickness of the second lens element 120 is CT2, and a central thickness of the third lens element 130 is CT3, the following condition is satisfied: CT2/CT3=0.90.

In the optical lens system of the imaging device according to the 1st embodiment, when the focal length of the second lens element 120 is f2, and the focal length of the third lens element 130 is f3, the following condition is satisfied: f3/f2=−0.81.

In the optical lens system of the imaging device according to the 1st embodiment, when an incident angle between a chief ray and a normal line on an image plane 160 at a maximum image height is CRA, the following condition is satisfied: CRA=28.6 degrees.

In the optical lens system of the imaging device according to the 1st embodiment, when the axial distance between the first lens element 110 and the second lens element 120 is T12, the axial distance between the second lens element 120 and the third lens element 130 is T23, the axial distance between the third lens element 130 and the fourth lens element 140 is T34, T34>T12, and T34>T23.

The detailed optical data of the 1st embodiment are shown in Table 1 and the aspheric surface data are shown in Table 2 below.

TABLE 1

1st Embodiment
f = 5.67 mm, Fno = 2.60, HFOV = 29.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.844 | ASP | 0.760 | Plastic | 1.544 | 55.9 | 3.96 |
| 2 | | 11.022 | ASP | 0.072 | | | | |
| 3 | Ape. Stop | Plano | | 0.662 | | | | |
| 4 | Lens 2 | −1.519 | ASP | 0.672 | Plastic | 1.650 | 21.5 | −8.94 |
| 5 | | −2.416 | ASP | 0.050 | | | | |
| 6 | Lens 3 | −27.204 | ASP | 0.743 | Plastic | 1.583 | 30.2 | 7.26 |
| 7 | | −3.700 | ASP | 1.027 | | | | |
| 8 | Lens 4 | −3.305 | ASP | 1.041 | Plastic | 1.650 | 21.5 | −8.06 |
| 9 | | −10.055 | ASP | 0.600 | | | | |
| 10 | IR-cut filter | Plano | | 0.500 | Glass | 1.517 | 64.2 | — |
| 11 | | Plano | | 0.634 | | | | |
| 12 | Image | Plano | | — | | | | |

Note:
Reference wavelength is 587.6 nm (d-line).

TABLE 2

Aspheric Coefficients

| | Surface # | | | |
|---|---|---|---|---|
| | 1 | 2 | 4 | 5 |
| k = | −6.5980E−01 | −9.0000E+01 | 5.2890E−02 | −3.9257E+01 |
| A4 = | 2.2711E−02 | 1.4612E−02 | 8.1879E−02 | −1.0270E−01 |
| A6 = | −1.0369E−02 | −1.8379E−02 | 5.7800E−02 | 2.9585E−01 |
| A8 = | 3.1523E−02 | 2.9984E−02 | −1.6272E−01 | −3.3692E−01 |
| A10 = | −3.5682E−02 | −3.1326E−02 | 1.5905E−01 | 2.2179E−01 |
| A12 = | 2.4398E−02 | 7.4403E−03 | −6.4696E−02 | −7.1204E−02 |
| A14 = | −7.5535E−03 | 0.0000E+00 | 2.8283E−12 | 1.0074E−02 |
| A16 = | | −6.0211E−12 | 1.1074E−13 | −2.5441E−06 |

| | Surface # | | | |
|---|---|---|---|---|
| | 6 | 7 | 8 | 9 |
| k = | 5.1362E+01 | −3.7573E+01 | −2.4763E+00 | 1.0060E+01 |
| A4 = | 1.1822E−01 | −1.1371E−01 | 1.7548E−03 | 3.2788E−02 |
| A6 = | −2.8148E−01 | 1.0388E−01 | −5.8216E−02 | −5.2572E−02 |
| A8 = | 4.1702E−01 | −1.3110E−01 | 3.6556E−02 | 2.8829E−02 |
| A10 = | −3.7219E−01 | 1.2147E−01 | −1.1884E−02 | −9.1928E−03 |
| A12 = | 1.8845E−01 | −6.4204E−02 | 2.3426E−03 | 1.7151E−03 |
| A14 = | −5.0590E−02 | 1.7126E−02 | −2.4472E−04 | −1.7126E−04 |
| A16 = | 5.6623E−03 | −1.7751E−03 | 1.0095E−05 | 7.0704E−06 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
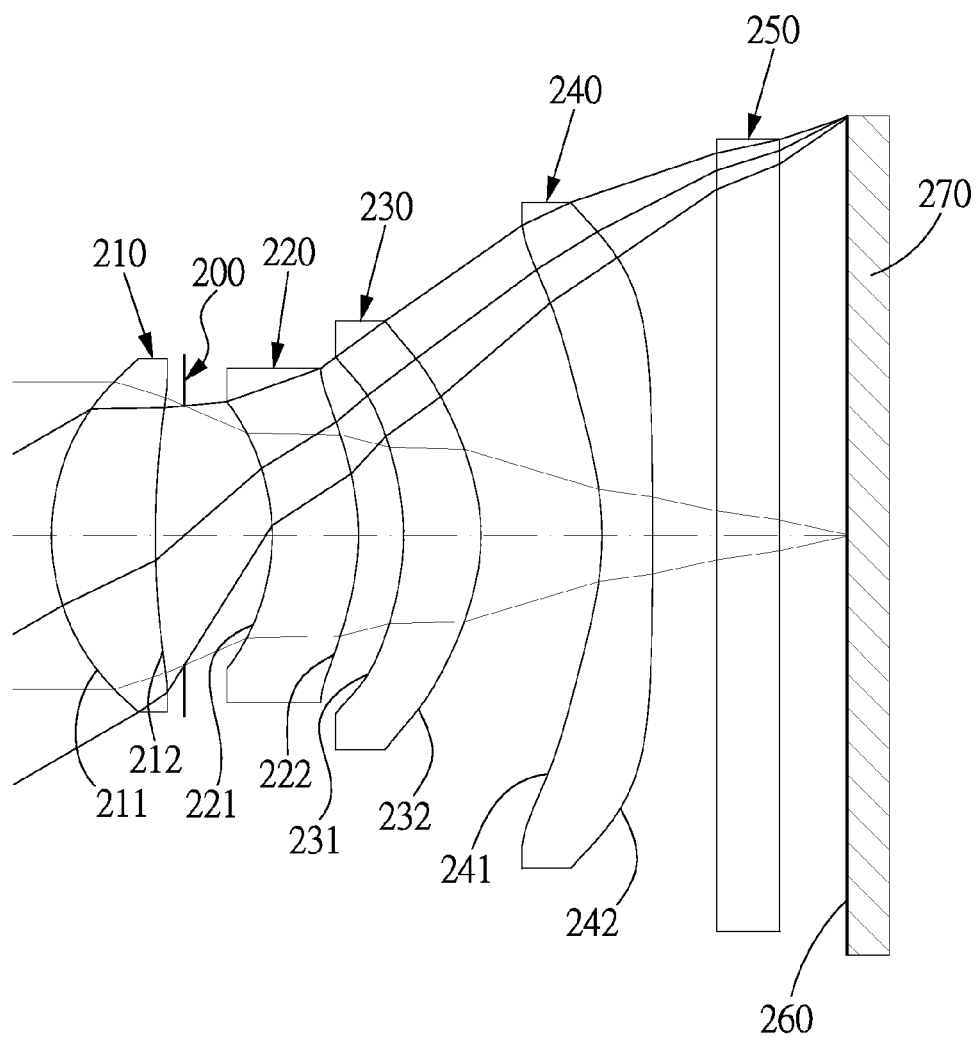
FIG. 2A is a schematic view of an imaging device according to the 2nd embodiment of the present disclosure.
Figure 2B:
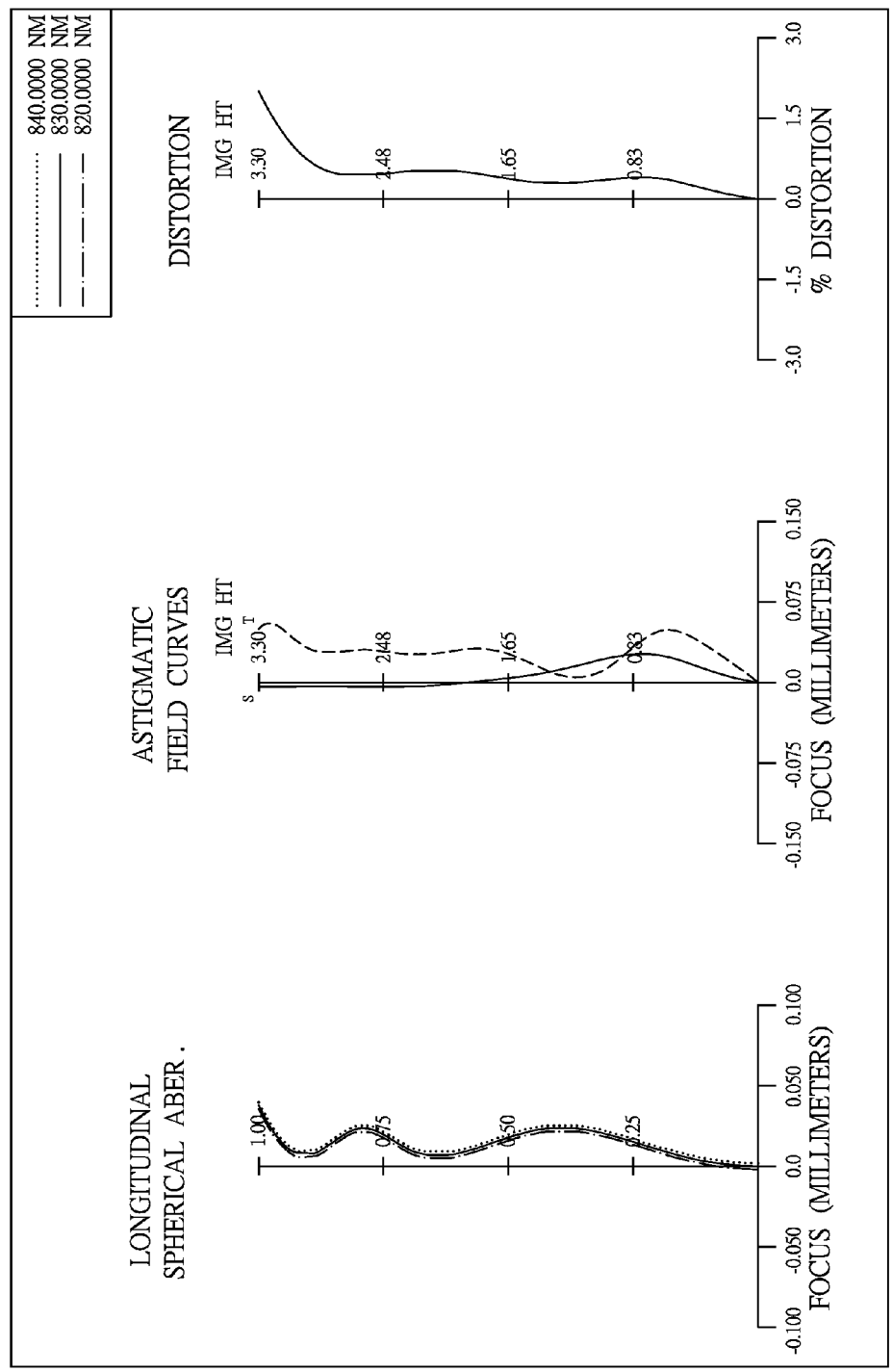
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging unit according to the 2nd embodiment.

In FIG. 2A, the imaging device includes the optical lens system (not otherwise herein labeled) of the present disclosure and an image sensor 270. The optical lens system comprises, in order from an object side to an image side, a first lens element 210, an aperture stop 200, a second lens element 220, a third lens element 230, a fourth lens element 240, an IR-cut filter 250 and an image plane 260, wherein the optical lens system has a total of four non-cemented lens elements (210-240) with refractive power. The optical lens system is used in the infrared wavelength range of 830 nm. In the optical lens system according to the 2nd embodiment, Abbe numbers of the second lens element 220, the third lens element 230 and the fourth lens elements 240 are smaller than 32.

The first lens element 210 with positive refractive power has an aspheric object-side surface 211 being convex in a paraxial region and an aspheric image-side surface 212 being concave in a paraxial region, and the first lens element 210 is made of plastic material.

The second lens element 220 with positive refractive power has an aspheric object-side surface 221 being concave in a paraxial region and an aspheric image-side surface 222 being convex in a paraxial region, and the second lens element 220 is made of plastic material.

The third lens element 230 with positive refractive power has an aspheric object-side surface 231 being concave in a paraxial region and an aspheric image-side surface 232 being convex in a paraxial region, and the third lens element 230 is made of plastic material.

The fourth lens element 240 with negative refractive power has an aspheric object-side surface 241 being concave in a paraxial region and an aspheric image-side surface 242 being convex in a paraxial region, the fourth lens element 240 is made of plastic material, and inflection points are formed on the object-side surface 241 and the image-side surface 242 of the fourth lens element 240.

Figure 9:
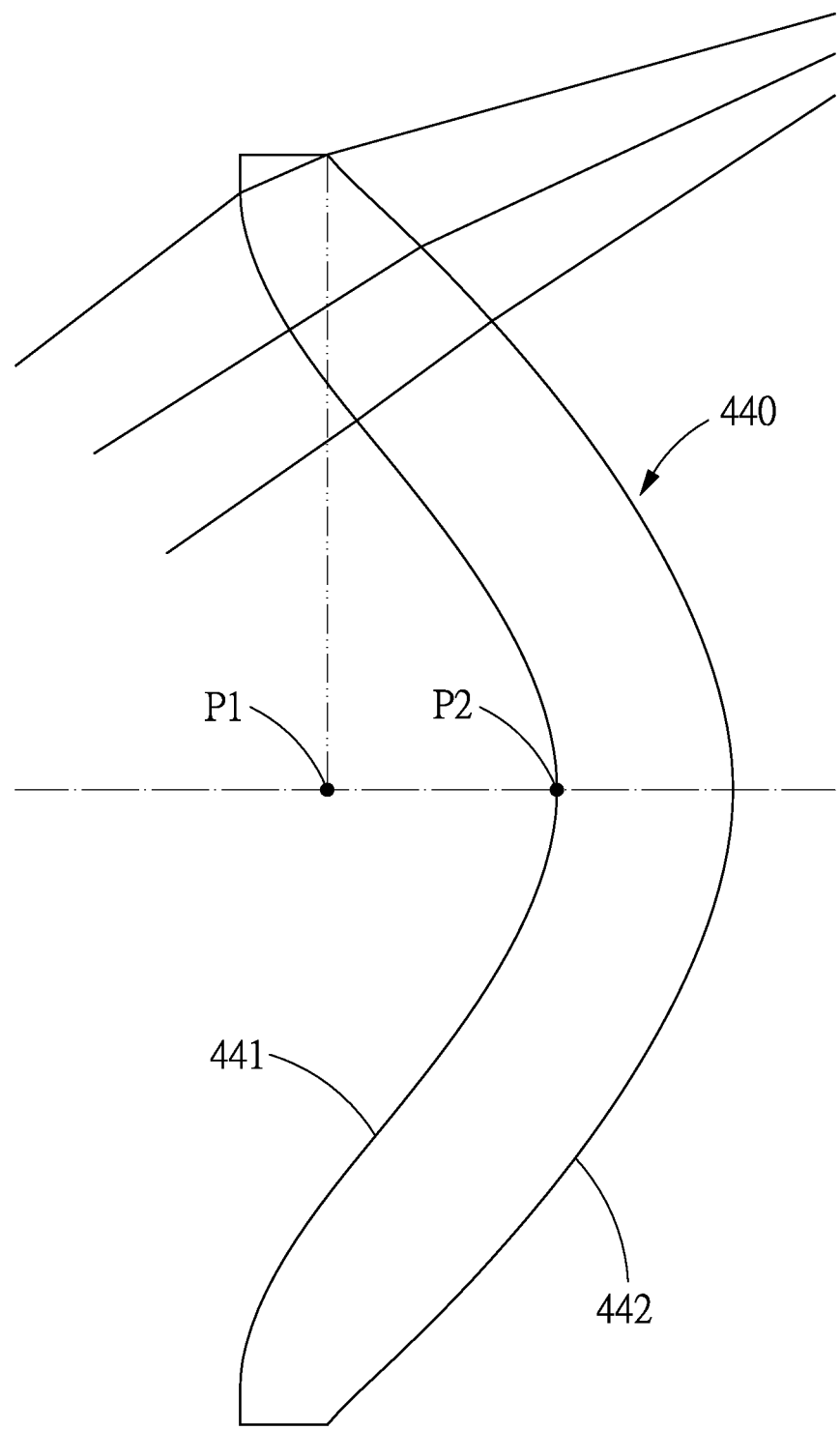
FIG. 9 shows a maximum effective radius position on an image-side surface of the fourth lens element of the optical lens system according to the 4th embodiment.

A point P1 of a maximum effective radius position on the image-side surface 242 of the first lens element 240 which is projected on the optical axis is located nearer an imaged object than an axial vertex P2 on the object-side surface 241 of the fourth lens element 240 (referring to FIG. 9, not otherwise herein drawn).

In the optical lens system of the imaging device according to the 2nd embodiment, when an axial distance between the first lens element 210 and the second lens element 220 is T12, an axial distance between the second lens element 220 and the third lens element 230 is T23, an axial distance between the third lens element 230 and the fourth lens element 240 is T34, T34>T12, and T34>T23.

The IR-cut filter 250 is made of glass and located between the fourth lens element 240 and the image plane 260, and will not affect the focal length of the optical lens system.

The detailed optical data of the 2nd embodiment are shown in Table 3 and the aspheric surface data are shown in Table 4 below.

TABLE 3

2nd Embodiment
f = 5.57 mm, Fno = 2.30, HFOV = 30.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.775 | ASP | 0.818 | Plastic | 1.537 | 55.9 | 4.10 |
| 2 | | 7.533 | ASP | 0.228 | | | | |
| 3 | Ape. Stop | Plano | | 0.691 | | | | |
| 4 | Lens 2 | −1.700 | ASP | 0.679 | Plastic | 1.614 | 23.4 | 49281.40 |
| 5 | | −1.958 | ASP | 0.355 | | | | |
| 6 | Lens 3 | −2.014 | ASP | 0.609 | Plastic | 1.614 | 23.4 | 9.50 |
| 7 | | −1.674 | ASP | 0.953 | | | | |
| 8 | Lens 4 | −2.471 | ASP | 0.400 | Plastic | 1.507 | 56.8 | −5.00 |
| 9 | | 80.551 | ASP | 0.500 | | | | |
| 10 | IR-cut filter | Plano | | 0.500 | Glass | 1.510 | 64.2 | — |
| 11 | | Plano | | 0.530 | | | | |
| 12 | Image | Plano | | — | | | | |

Note:
Reference wavelength is 830 nm (d-line).

TABLE 4

Aspheric Coefficients

| | Surface # | | | |
|---|---|---|---|---|
| | 1 | 2 | 4 | 5 |
| k = | −5.9443E−01 | −5.0752E+01 | −6.1094E−01 | −1.4497E+01 |
| A4 = | 1.9699E−02 | 2.3758E−02 | −1.2280E−02 | −1.7204E−01 |
| A6 = | −9.0386E−03 | −2.1512E−02 | 5.1609E−02 | 3.0320E−01 |
| A8 = | 3.5431E−02 | 2.9151E−02 | −1.3420E−01 | −3.3113E−01 |
| A10 = | −4.1515E−02 | −2.2468E−02 | 1.4014E−01 | 2.0981E−01 |
| A12 = | 2.4915E−02 | 4.9021E−03 | −5.7329E−02 | −7.0939E−02 |
| A14 = | −5.8105E−03 | | | 1.0942E−02 |

| | Surface # | | | |
|---|---|---|---|---|
| | 6 | 7 | 8 | 9 |
| k = | 6.9391E−01 | −9.5362E+00 | −1.5722E+00 | 9.0000E+01 |
| A4 = | 6.7244E−02 | −1.7212E−01 | 3.3141E−02 | −1.3412E−02 |
| A6 = | −2.6642E−02 | 1.9739E−01 | 5.7532E−03 | 8.2481E−03 |
| A8 = | 6.5944E−02 | −1.5683E−01 | −6.2305E−03 | −3.5926E−03 |
| A10 = | −8.0644E−02 | 9.2103E−02 | 1.3316E−03 | 6.2540E−04 |
| A12 = | 2.9637E−02 | −4.0473E−02 | −1.0932E−04 | −4.8735E−05 |
| A14 = | −2.0409E−03 | 1.0490E−02 | 2.9818E−06 | 2.2087E−07 |
| A16 = | | −1.1060E−03 | | 1.5219E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.57 | T34/f | 0.17 |
| Fno | 2.30 | R4/R3 | 1.15 |
| HFOV [deg.] | 30.1 | R5/R6 | 1.20 |
| CRA [deg.] | 27.1 | R5/R8 | 0.03 |
| CT2/CT3 | 1.11 | f3/f2 | 0.00 |
| CT4/T12 | 0.44 | |f1/f2| + |f1/f3| + |f1/f4| | 1.25 |
| T23/T34 | 0.37 | | |

3rd Embodiment

Figure 3A:
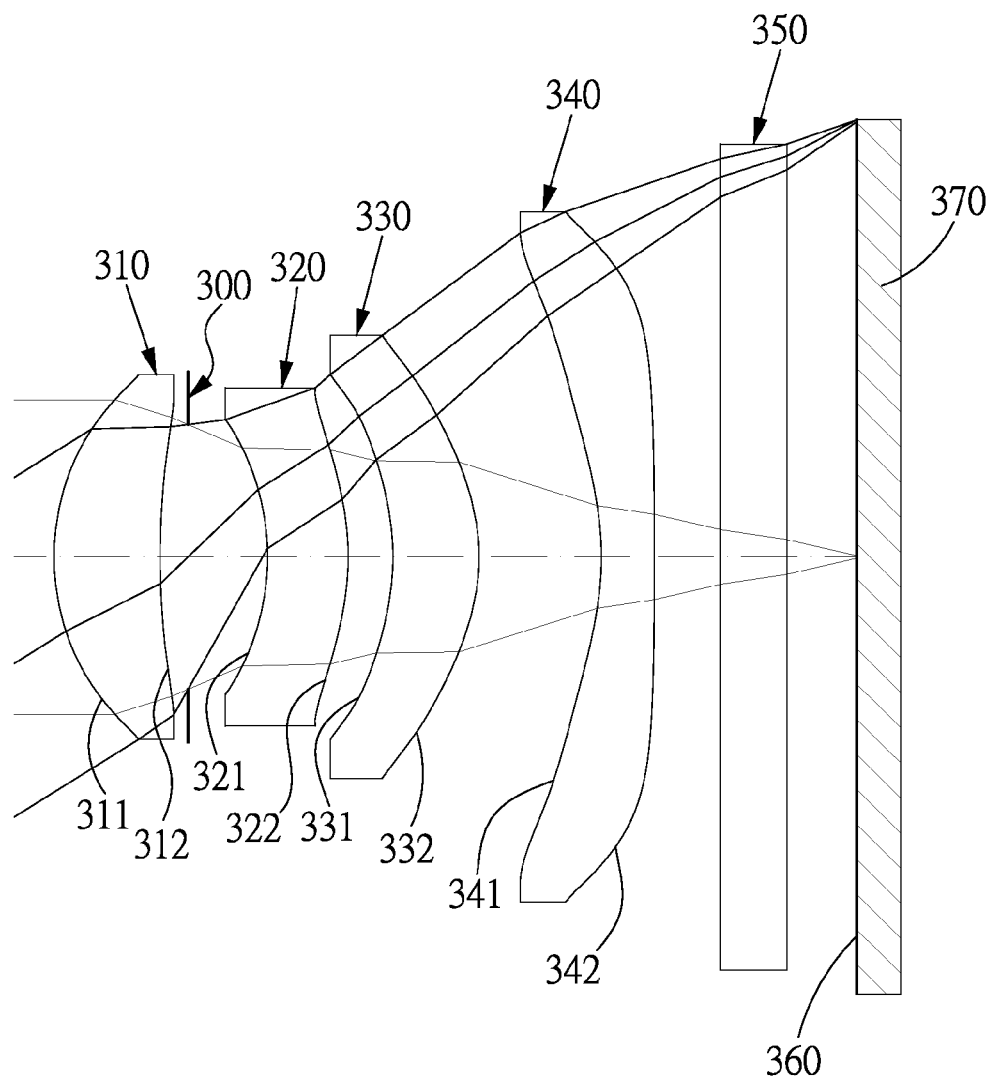
FIG. 3A is a schematic view of an imaging device according to the 3rd embodiment of the present disclosure.
Figure 3B:
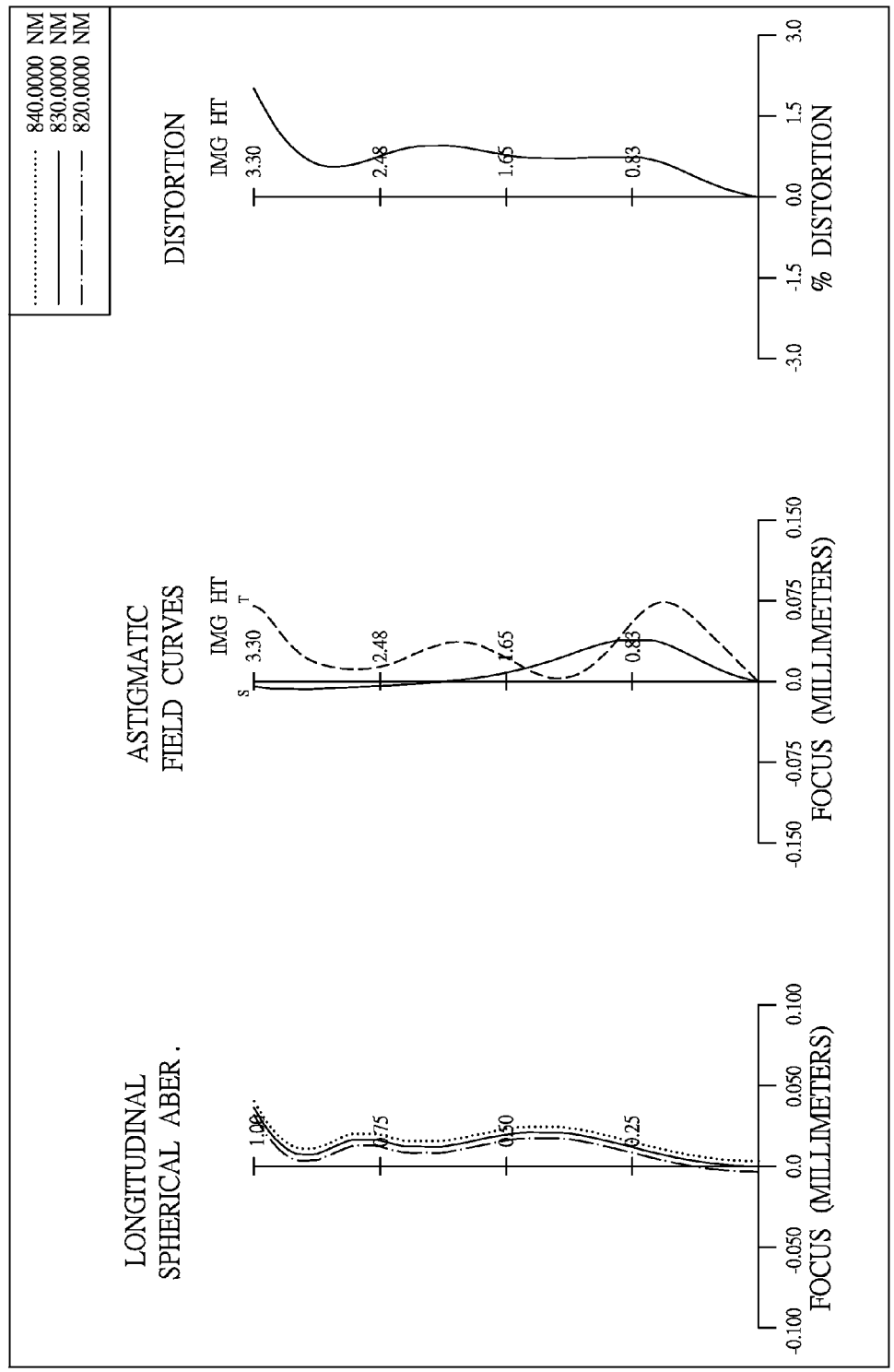
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging unit according to the 3rd embodiment.

In FIG. 3A, the imaging device includes the optical lens system (not otherwise herein labeled) of the present disclosure and an image sensor 370. The optical lens system comprises, in order from an object side to an image side, a first lens element 310, an aperture stop 300, a second lens element 320, a third lens element 330, a fourth lens element 340, an IR-cut filter 350 and an image plane 360, wherein the optical lens system has a total of four non-cemented lens elements (310-340) with refractive power. The optical lens system is used in the infrared wavelength range of 830 nm. In the optical lens system according to the 3rd embodiment, Abbe numbers of the second lens element 320, the third lens element 330 and the fourth lens elements 340 are smaller than 32.

The first lens element 310 with positive refractive power has an aspheric object-side surface 311 being convex in a paraxial region and an aspheric image-side surface 312 being concave in a paraxial region, and the first lens element 310 is made of plastic material.

The second lens element 320 with positive refractive power has an aspheric object-side surface 321 being concave in a paraxial region and an aspheric image-side surface 322 being convex in a paraxial region, and the second lens element 320 is made of plastic material.

The third lens element 330 with positive refractive power has an aspheric object-side surface 331 being concave in a paraxial region and an aspheric image-side surface 332 being convex in a paraxial region, and the third lens element 330 is made of plastic material.

The fourth lens element 340 with negative refractive power has an aspheric object-side surface 341 being concave in a paraxial region and an aspheric image-side surface 342 being convex in a paraxial region, the fourth lens element 340 is made of plastic material, and inflection points are formed on the object-side surface 341 and the image-side surface 342 of the fourth lens element 340.

A point P1 of a maximum effective radius position on the image-side surface 342 of the first lens element 340 which is projected on the optical axis is located nearer an imaged object than an axial vertex P2 on the object-side surface 341 of the fourth lens element 340 (referring to FIG. 9, not otherwise herein drawn).

In the optical lens system of the imaging device according to the 3rd embodiment, when an axial distance between the first lens element 310 and the second lens element 320 is T12, an axial distance between the second lens element 320 and the third lens element 330 is T23, an axial distance between the third lens element 330 and the fourth lens element 340 is T34, T34>T12, and T34>T23.

The IR-cut filter 350 is made of glass and located between the fourth lens element 340 and the image plane 360, and will not affect the focal length of the optical lens system.

The detailed optical data of the 3rd embodiment are shown in Table 5 and the aspheric surface data are shown in Table 6 below.

TABLE 5

3rd Embodiment
f = 5.17 mm, Fno = 2.20, HFOV = 32.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.822 | ASP | 0.801 | Plastic | 1.586 | 30.0 | 4.13 |
| 2 | | 6.181 | ASP | 0.211 | | | | |
| 3 | Ape. Stop | Plano | | 0.601 | | | | |
| 4 | Lens 2 | −1.864 | ASP | 0.608 | Plastic | 1.647 | 20.0 | 327.09 |
| 5 | | −2.085 | ASP | 0.338 | | | | |
| 6 | Lens 3 | −1.980 | ASP | 0.651 | Plastic | 1.647 | 20.0 | 7.57 |
| 7 | | −1.592 | ASP | 0.923 | | | | |
| 8 | Lens 4 | −2.381 | ASP | 0.400 | Plastic | 1.483 | 59.9 | −5.04 |
| 9 | | −118.843 | ASP | 0.500 | | | | |
| 10 | IR-cut filter | Plano | | 0.500 | Glass | 1.510 | 64.2 | — |
| 11 | | Plano | | 0.530 | | | | |
| 12 | Image | Plano | | — | | | | |

Note:
Reference wavelength is 830 nm (d-line).

TABLE 6

Aspheric Coefficients

| Surface # | 1 | 2 | 4 | 5 |
|---|---|---|---|---|
| k = | −5.9097E−01 | −4.4341E+01 | −6.1272E−01 | −1.6950E+01 |
| A4 = | 2.1003E−02 | 3.0448E−02 | −1.3357E−02 | −1.6493E−01 |
| A6 = | −1.2239E−02 | −2.3868E−02 | 4.4715E−02 | 3.0374E−01 |
| A8 = | 3.8310E−02 | 2.6872E−02 | −1.2872E−01 | −3.3194E−01 |
| A10 = | −4.2202E−02 | −2.2769E−02 | 1.3696E−01 | 2.0956E−01 |
| A12 = | 2.4548E−02 | 5.3092E−03 | −5.5579E−02 | −7.0625E−02 |
| A14 = | −5.7776E−03 | | | 1.1339E−02 |

| Surface # | 6 | 7 | 8 | 9 |
|---|---|---|---|---|
| k = | 6.6166E−01 | −9.0544E+00 | −1.9420E+00 | −9.0000E+01 |
| A4 = | 6.6424E−02 | −1.8591E−01 | 3.4860E−02 | −9.7097E−03 |
| A6 = | −2.0096E−02 | 2.0478E−01 | 2.9425E−03 | 3.7099E−03 |
| A8 = | 6.7289E−02 | −1.5656E−01 | −5.0880E−03 | −1.1328E−03 |
| A10 = | −8.0473E−02 | 9.2104E−02 | 1.1184E−03 | −1.6354E−04 |
| A12 = | 2.9628E−02 | −4.0493E−02 | −9.0497E−05 | 9.7090E−05 |
| A14 = | −2.0627E−03 | 1.0477E−02 | 2.3580E−06 | −1.4358E−05 |
| A16 = | | −1.1110E−03 | | 7.6436E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.17 | T34/f | 0.18 |
| Fno | 2.20 | R4/R3 | 1.12 |
| HFOV [deg.] | 32.0 | R5/R6 | 1.24 |
| CRA [deg.] | 27.3 | R5/R8 | 0.02 |
| CT2/CT3 | 0.93 | f3/f2 | 0.02 |
| CT4/T12 | 0.49 | \|f1/f2\| + \|f1/f3\| + \|f1/f4\| | 1.38 |
| T23/T34 | 0.37 | | |

4th Embodiment

Figure 4A:
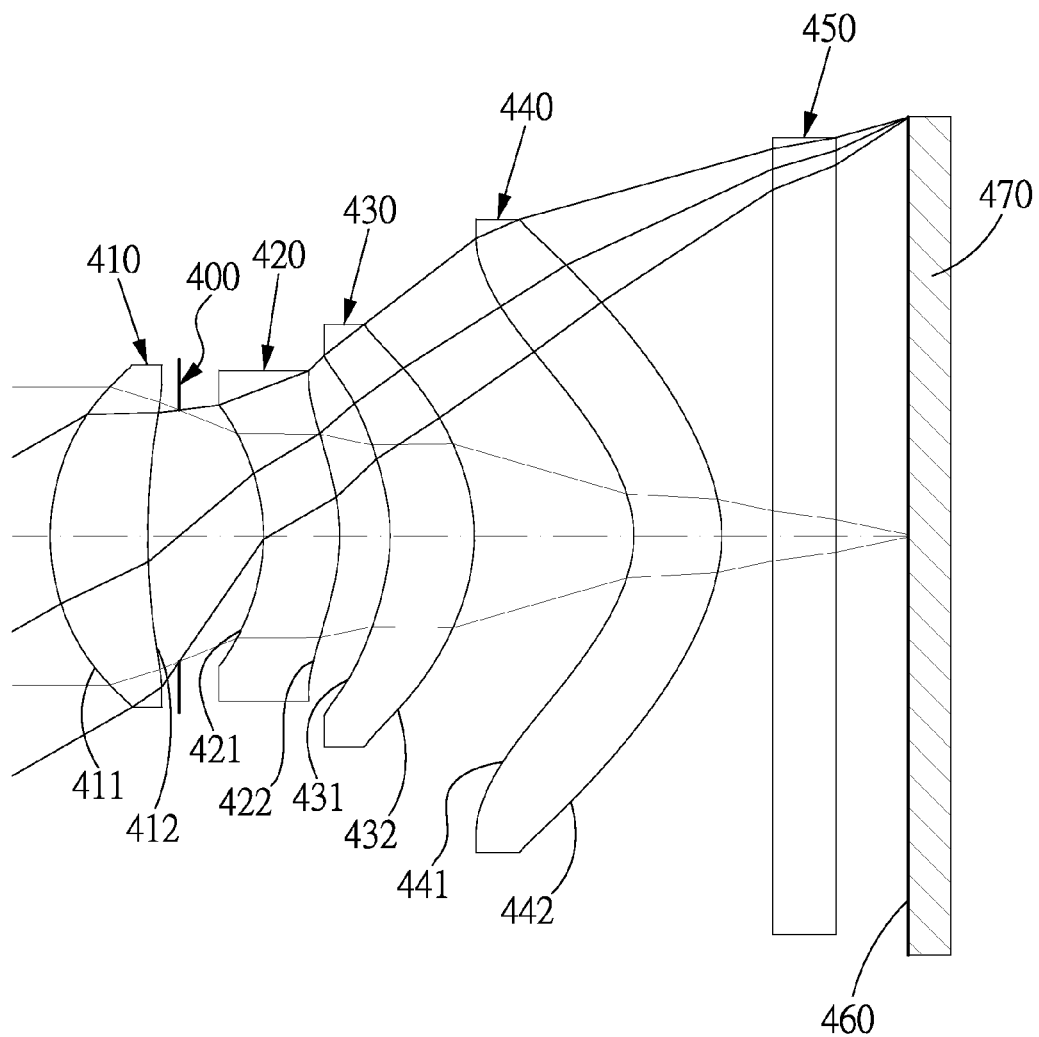
FIG. 4A is a schematic view of an imaging device according to the 4th embodiment of the present disclosure.
Figure 4B:
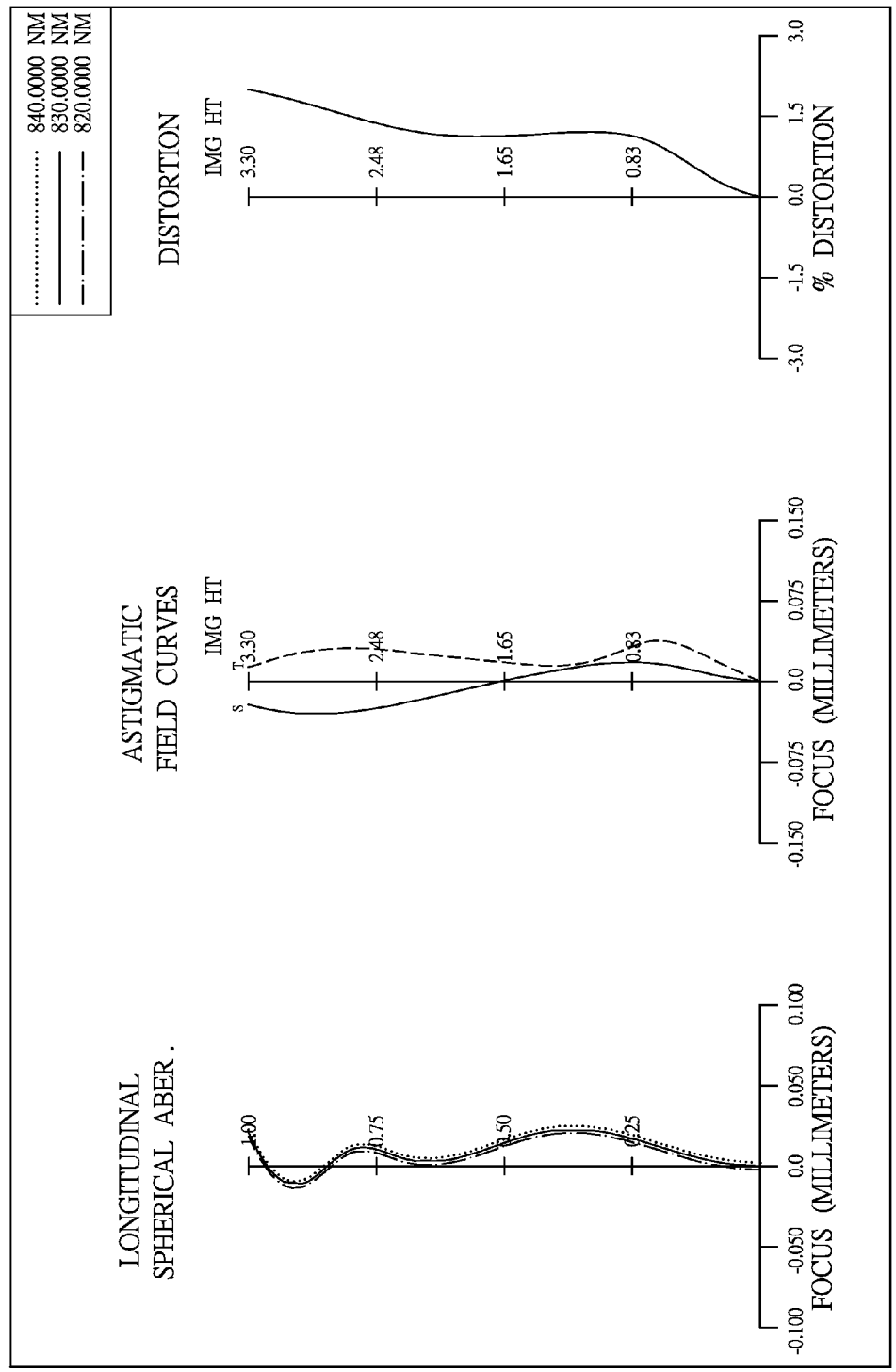
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging unit according to the 4th embodiment.

In FIG. 4A, the imaging device includes the optical lens system (not otherwise herein labeled) of the present disclosure and an image sensor 470. The optical lens system comprises, in order from an object side to an image side, a first lens element 410, an aperture stop 400, a second lens element 420, a third lens element 430, a fourth lens element 440, an IR-cut filter 450 and an image plane 460, wherein the optical lens system has a total of four non-cemented lens elements (410-440) with refractive power. The optical lens system is used in the infrared wavelength range of 830 nm. In the optical lens system according to the 4th embodiment, Abbe numbers of the second lens element 420, the third lens element 430 and the fourth lens elements 440 are smaller than 32.

The first lens element 410 with positive refractive power has an aspheric object-side surface 411 being convex in a paraxial region and an aspheric image-side surface 412 being concave in a paraxial region, and the first lens element 410 is made of plastic material.

The second lens element 420 with positive refractive power has an aspheric object-side surface 421 being concave in a paraxial region and an aspheric image-side surface 422 being convex in a paraxial region, and the second lens element 420 is made of plastic material.

The third lens element 430 with positive refractive power has an aspheric object-side surface 431 being concave in a paraxial region and an aspheric image-side surface 432 being convex in a paraxial region, and the third lens element 430 is made of plastic material.

The fourth lens element 440 with negative refractive power has an aspheric object-side surface 441 being concave in a paraxial region and an aspheric image-side surface 442 being convex in a paraxial region, the fourth lens element 440 is made of plastic material, and inflection points are formed on the object-side surface 341 and the image-side surface 442 of the fourth lens element 440.

With reference to FIG. 9, which shows a maximum effective radius position on the image-side surface 442 of the first lens element 440, wherein a point P1 of the maximum effective radius position on the image-side surface 442 of the first lens element 440 which is projected on the optical axis is located nearer an imaged object than an axial vertex P2 on the object-side surface 441 of the fourth lens element 440.

In the optical lens system of the imaging device according to the 4th embodiment, when an axial distance between the first lens element 410 and the second lens element 420 is T12, an axial distance between the second lens element 420 and the third lens element 430 is T23, an axial distance between the third lens element 430 and the fourth lens element 440 is T34, T34>T12, and T34>T23.

The IR-cut filter 450 is made of glass and located between the fourth lens element 440 and the image plane 460, and will not affect the focal length of the optical lens system.

The detailed optical data of the 4th embodiment are shown in Table 7 and the aspheric surface data are shown in Table 8 below.

TABLE 7

4th Embodiment
f = 5.65 mm, Fno = 2.43, HFOV = 29.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.757 | ASP | 0.768 | Plastic | 1.537 | 55.9 | 4.37 |
| 2 | | 5.900 | ASP | 0.247 | | | | |
| 3 | Ape. Stop | Plano | | 0.664 | | | | |
| 4 | Lens 2 | −1.532 | ASP | 0.600 | Plastic | 1.621 | 23.5 | 22.75 |
| 5 | | −1.589 | ASP | 0.396 | | | | |
| 6 | Lens 3 | −1.551 | ASP | 0.664 | Plastic | 1.621 | 23.5 | 11.28 |
| 7 | | −1.478 | ASP | 1.256 | | | | |
| 8 | Lens 4 | −0.953 | ASP | 0.691 | Plastic | 1.537 | 55.9 | −17.67 |
| 9 | | −1.327 | ASP | 0.400 | | | | |
| 10 | IR-cut filter | Plano | | 0.500 | Glass | 1.510 | 64.2 | — |
| 11 | | Plano | | 0.572 | | | | |
| 12 | Image | Plano | | — | | | | |

Note:
Reference wavelength is 830 nm (d-line).

TABLE 8

Aspheric Coefficients

| | Surface # | | | |
|---|---|---|---|---|
| | 1 | 2 | 4 | 5 |
| k = | −6.2641E−01 | −2.7565E+01 | 6.0598E−01 | −9.1344E+00 |
| A4 = | 2.1219E−02 | 2.5621E−02 | 6.0224E−02 | −1.2591E−01 |
| A6 = | −3.6621E−03 | −2.1874E−02 | 8.4300E−02 | 3.0190E−01 |
| A8 = | 2.8181E−02 | 3.3196E−02 | −1.4740E−01 | −3.3297E−01 |
| A10 = | −3.6776E−02 | −2.9557E−02 | 1.4768E−01 | 2.1360E−01 |
| A12 = | 2.5003E−02 | 7.1690E−03 | −5.4535E−02 | −7.1650E−02 |
| A14 = | −6.5841E−03 | | | 1.0231E−02 |

| | Surface # | | | |
|---|---|---|---|---|
| | 6 | 7 | 8 | 9 |
| k = | −5.0431E−01 | −6.0418E+00 | −2.2109E+00 | −2.6897E+00 |
| A4 = | 1.5703E−01 | −1.4130E−01 | −6.2925E−03 | −6.7682E−06 |
| A6 = | −1.2080E−01 | 1.3703E−01 | −1.6125E−02 | −1.0318E−02 |
| A8 = | 9.4269E−02 | −1.3142E−01 | 1.2052E−02 | 4.0339E−03 |
| A10 = | −7.1832E−02 | 8.9940E−02 | −2.9833E−03 | −8.0890E−04 |
| A12 = | 2.8320E−02 | −4.0846E−02 | 3.3701E−04 | 1.1232E−04 |
| A14 = | −3.6730E−03 | 1.0539E−02 | −1.4639E−05 | −1.2426E−05 |
| A16 = | | −1.1132E−03 | | 7.3372E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.65 | T34/f | 0.22 |
| Fno | 2.43 | R4/R3 | 1.04 |
| HFOV [deg.] | 29.8 | R5/R6 | 1.05 |
| CRA [deg.] | 25.0 | R5/R8 | 1.17 |
| CT2/CT3 | 0.90 | f3/f2 | 0.50 |
| CT4/T12 | 0.76 | |f1/f2| + |f1/f3| + |f1/f4| | 0.83 |
| T23/T34 | 0.32 | | |

5th Embodiment

Figure 5A:
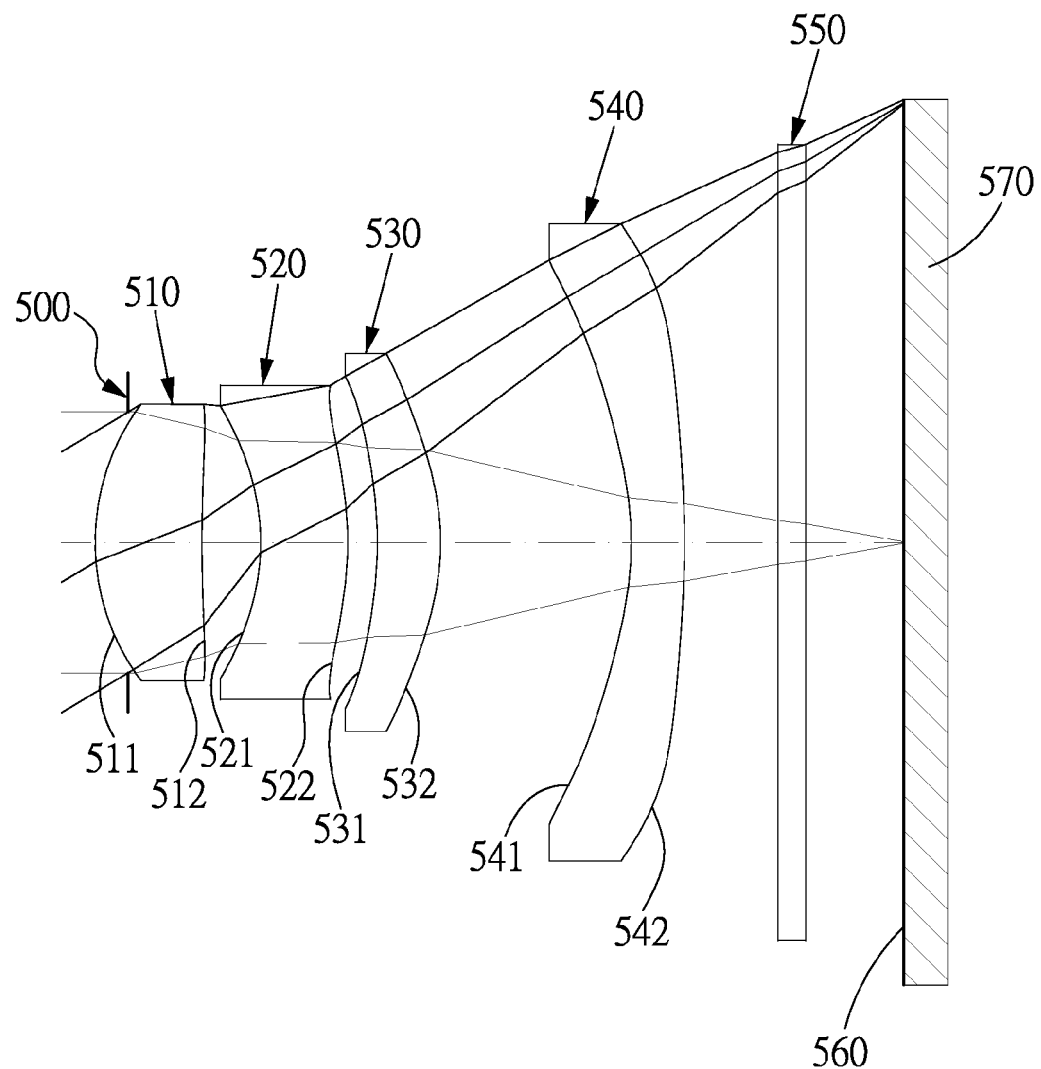
FIG. 5A is a schematic view of an imaging device according to the 5th embodiment of the present disclosure.
Figure 5B:
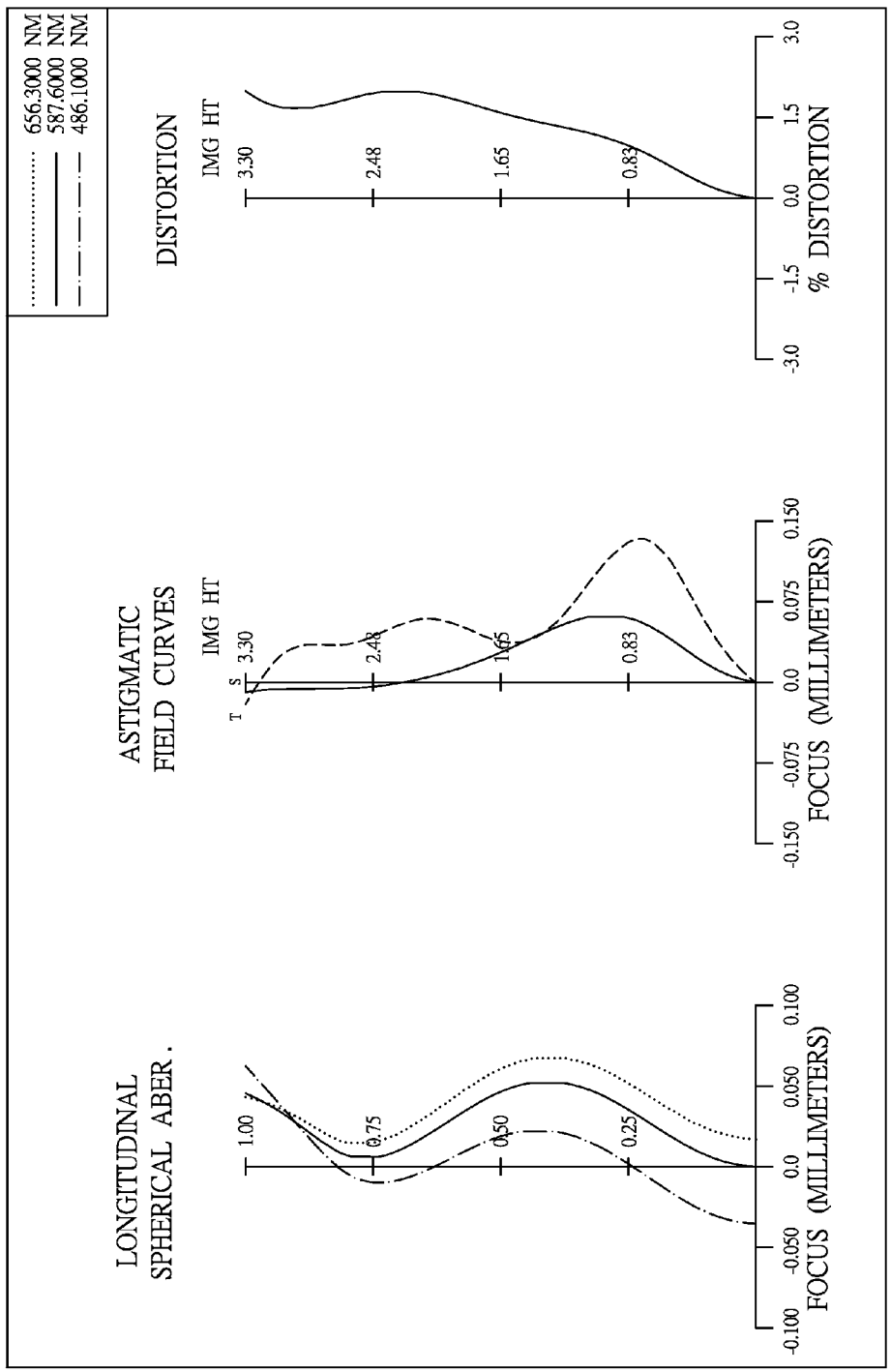
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging unit according to the 5th embodiment.

In FIG. 5A, the imaging device includes the optical lens system (not otherwise herein labeled) of the present disclosure and an image sensor 570. The optical lens system comprises, in order from an object side to an image side, a first lens element 510, an aperture stop 500, a second lens element 520, a third lens element 530, a fourth lens element 540, an IR-cut filter 550 and an image plane 560, wherein the optical lens system has a total of four non-cemented lens elements (510-540) with refractive power.

The first lens element 510 with positive refractive power has an aspheric object-side surface 511 being convex in a paraxial region and an aspheric image-side surface 512 being concave in a paraxial region, and the first lens element 510 is made of plastic material.

The second lens element 520 with negative refractive power has an aspheric object-side surface 521 being concave in a paraxial region and an aspheric image-side surface 522 being convex in a paraxial region, and the second lens element 520 is made of plastic material.

The third lens element 530 with positive refractive power has an aspheric object-side surface 531 being concave in a paraxial region and an aspheric image-side surface 532 being convex in a paraxial region, and the third lens element 530 is made of plastic material.

The fourth lens element 540 with negative refractive power has an aspheric object-side surface 541 being concave in a paraxial region and an aspheric image-side surface 542 being convex in a paraxial region, the fourth lens element 540 is made of plastic material, and inflection points are formed on the object-side surface 541 and the image-side surface 542 of the fourth lens element 540.

A point P1 of a maximum effective radius position on the image-side surface 542 of the first lens element 540 which is projected on the optical axis is located nearer an imaged object than an axial vertex P2 on the object-side surface 541 of the fourth lens element 540 (referring to FIG. 9, not otherwise herein drawn).

In the optical lens system of the imaging device according to the 5th embodiment, when an axial distance between the first lens element 510 and the second lens element 520 is T12, an axial distance between the second lens element 520 and the third lens element 530 is T23, an axial distance between the third lens element 530 and the fourth lens element 540 is T34, T34>T12, and T34>T23.

The IR-cut filter 550 is made of glass and located between the fourth lens element 540 and the image plane 560, and will not affect the focal length of the optical lens system.

The detailed optical data of the 5th embodiment are shown in Table 9 and the aspheric surface data are shown in Table 10 below.

TABLE 9

5th Embodiment
f = 5.39 mm, Fno = 2.75, HFOV = 30.9 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.247 |  |  |  |  |
| 2 | Lens 1 | 1.793 | ASP | 0.802 | Plastic | 1.544 | 55.9 | 3.74 |
| 3 |  | 12.694 | ASP | 0.441 |  |  |  |  |
| 4 | Lens 2 | −1.727 | ASP | 0.654 | Plastic | 1.650 | 21.5 | −11.10 |
| 5 |  | −2.609 | ASP | 0.223 |  |  |  |  |
| 6 | Lens 3 | −3.009 | ASP | 0.474 | Plastic | 1.514 | 56.8 | 9.25 |
| 7 |  | −1.941 | ASP | 1.432 |  |  |  |  |
| 8 | Lens 4 | −2.511 | ASP | 0.400 | Plastic | 1.535 | 55.7 | −7.30 |
| 9 |  | −7.435 | ASP | 0.700 |  |  |  |  |
| 10 | IR-cut filter | Plano |  | 0.210 | Glass | 1.517 | 64.2 | — |
| 11 |  | Plano |  | 0.736 |  |  |  |  |
| 12 | Image | Plano |  | — |  |  |  |  |

Note:
Reference wavelength is 587.6 nm (d-line).

TABLE 10

Aspheric Coefficients

| | Surface # | | | |
|---|---|---|---|---|
| | 2 | 3 | 4 | 5 |
| k = | −4.9663E−01 | −9.0000E+01 | −9.4734E−01 | −3.2630E+01 |
| A4 = | 2.3265E−02 | 6.1346E−03 | 2.7577E−04 | −1.4485E−01 |
| A6 = | −1.0216E−02 | −2.5845E−02 | 4.5001E−02 | 3.0085E−01 |
| A8 = | 3.7990E−02 | 2.3079E−02 | −1.2782E−01 | −3.3148E−01 |
| A10 = | −4.3756E−02 | −2.6499E−02 | 1.3894E−01 | 2.1182E−01 |
| A12 = | 2.4369E−02 | 4.3648E−03 | −5.3883E−02 | −6.7546E−02 |
| A14 = | −5.7362E−03 |  |  | 1.0981E−02 |

| | Surface # | | | |
|---|---|---|---|---|
| | 6 | 7 | 8 | 9 |
| k = | 1.2246E+00 | −1.4260E+01 | −9.0956E−01 | −9.0000E+01 |
| A4 = | 4.5440E−02 | −1.7018E−01 | 3.7470E−02 | −2.3454E−03 |
| A6 = | −2.6595E−02 | 2.0725E−01 | −3.4606E−03 | 2.9832E−03 |
| A8 = | 6.8031E−02 | −1.5740E−01 | −1.6441E−03 | −1.5971E−03 |
| A10 = | −7.9894E−02 | 9.1873E−02 | 2.0051E−04 | −3.7747E−05 |
| A12 = | 2.9612E−02 | −4.0515E−02 | 3.6204E−05 | 1.0269E−04 |
| A14 = | −2.3510E−03 | 1.0484E−02 | −3.9025E−06 | −1.8484E−05 |
| A16 = |  | −1.1102E−03 |  | 1.1126E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.39 | T34/f | 0.27 |
| Fno | 2.75 | R4/R3 | 1.51 |
| HFOV [deg.] | 30.9 | R5/R6 | 1.55 |
| CRA [deg.] | 30.9 | R5/R8 | 0.40 |
| CT2/CT3 | 1.38 | f3/f2 | -0.83 |
| CT4/T12 | 0.91 | \|f1/f2\| + \|f1/f3\| + \|f1/f4\| | 1.25 |
| T23/T34 | 0.16 | | |

6th Embodiment

Figure 6A:
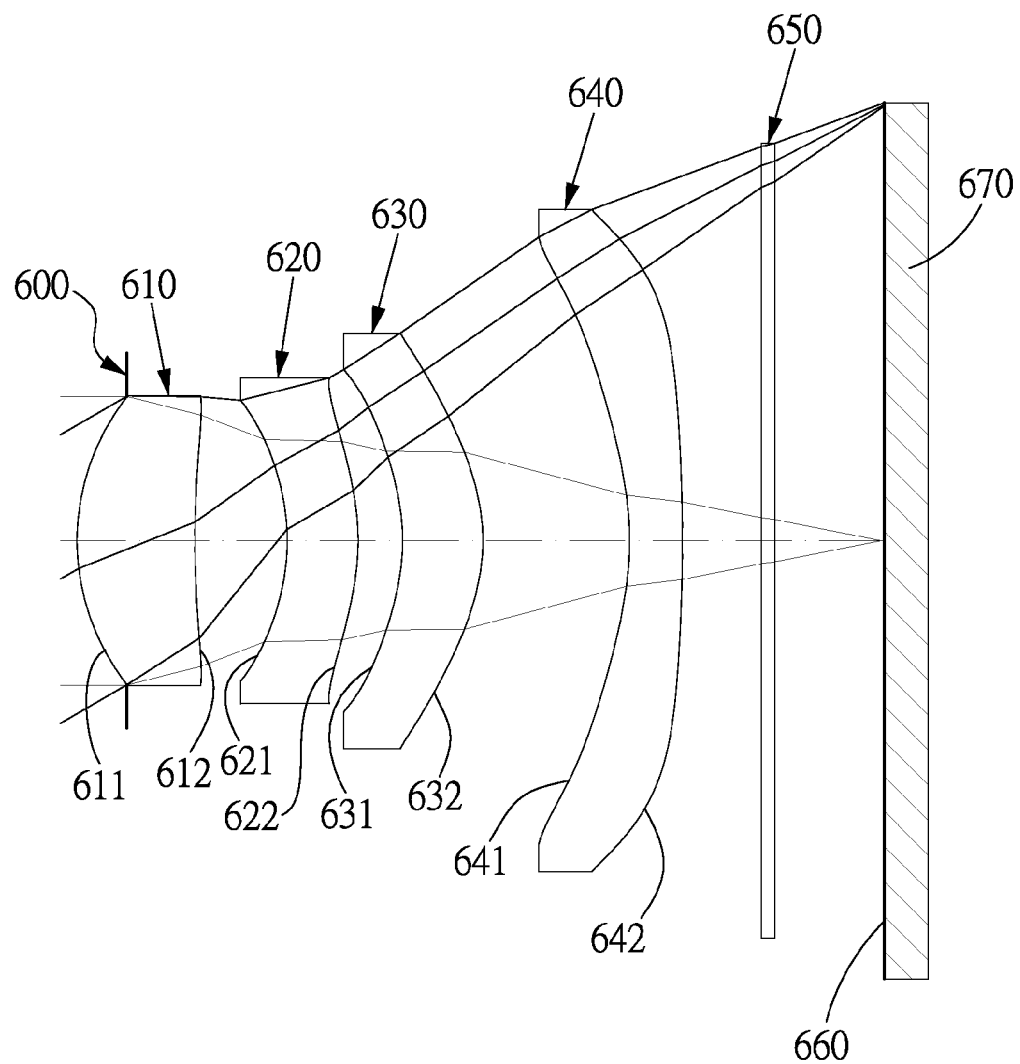
FIG. 6A is a schematic view of an imaging device according to the 6th embodiment of the present disclosure.
Figure 6B:
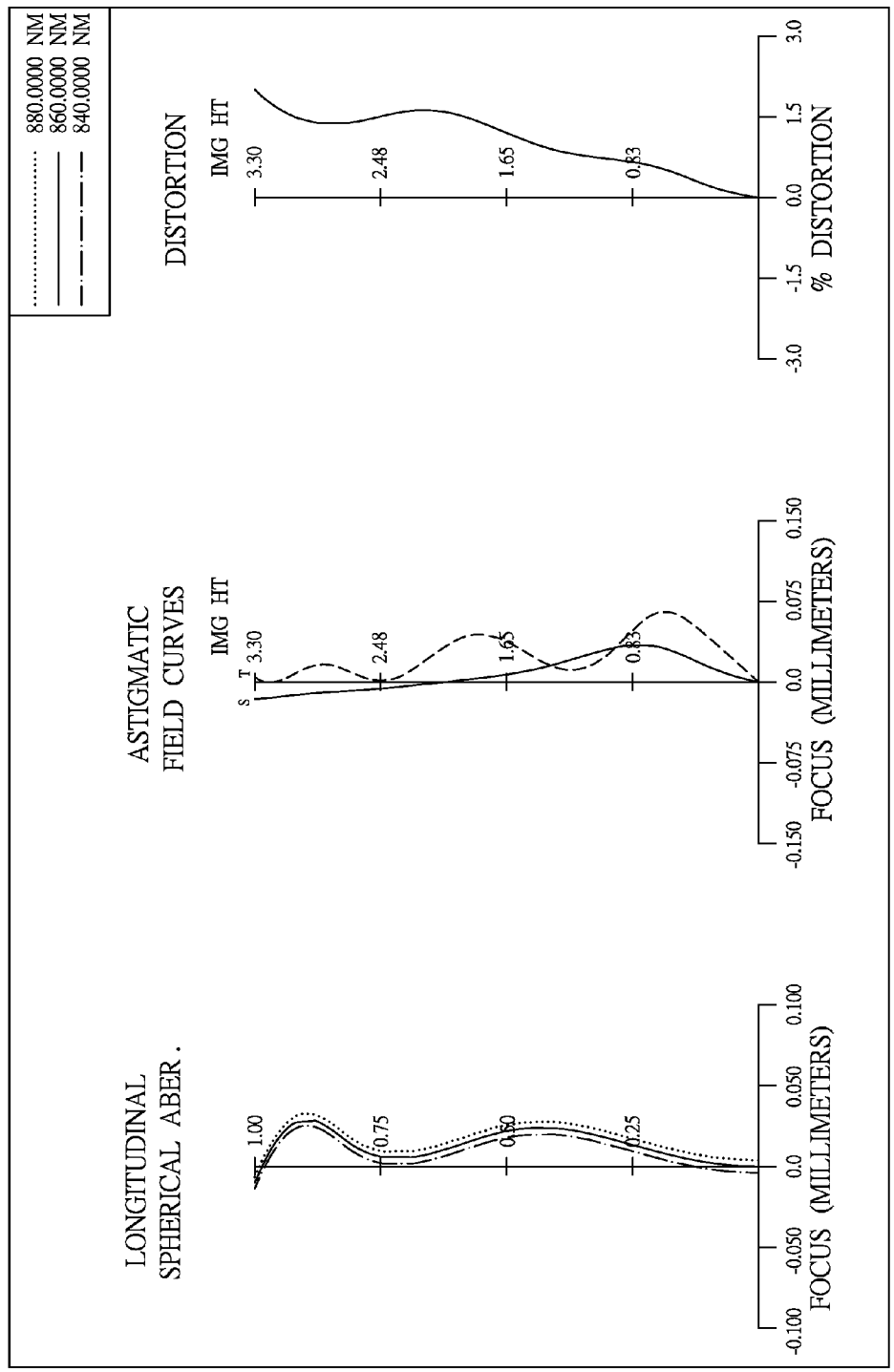
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging unit according to the 6th embodiment.

In FIG. 6A, the imaging device includes the optical lens system (not otherwise herein labeled) of the present disclosure and an image sensor 670. The optical lens system comprises, in order from an object side to an image side, a first lens element 610, an aperture stop 600, a second lens element 620, a third lens element 630, a fourth lens element 640, an IR-cut filter 650 and an image plane 660, wherein the optical lens system has a total of four non-cemented lens elements (610-640) with refractive power. The optical lens system is used in the infrared wavelength range of 860 nm. In the optical lens system according to the 6th embodiment, Abbe numbers of the second lens element 620, the third lens element 630 and the fourth lens elements 640 are smaller than 32.

The first lens element 610 with positive refractive power has an aspheric object-side surface 611 being convex in a paraxial region and an aspheric image-side surface 612 being concave in a paraxial region, and the first lens element 610 is made of glass material.

The second lens element 620 with negative refractive power has an aspheric object-side surface 621 being concave in a paraxial region and an aspheric image-side surface 622 being convex in a paraxial region, and the second lens element 620 is made of plastic material.

The third lens element 630 with positive refractive power has an aspheric object-side surface 631 being concave in a paraxial region and an aspheric image-side surface 632 being convex in a paraxial region, and the third lens element 630 is made of plastic material.

The fourth lens element 640 with negative refractive power has an aspheric object-side surface 641 being concave in a paraxial region and an aspheric image-side surface 642 being convex in a paraxial region, the fourth lens element 640 is made of plastic material, and inflection points are formed on the object-side surface 641 and the image-side surface 642 of the fourth lens element 640.

A point P1 of a maximum effective radius position on the image-side surface 642 of the first lens element 640 which is projected on the optical axis is located nearer an imaged object than an axial vertex P2 on the object-side surface 641 of the fourth lens element 640 (referring to FIG. 9, not otherwise herein drawn).

In the optical lens system of the imaging device according to the 6th embodiment, when an axial distance between the first lens element 610 and the second lens element 620 is T12, an axial distance between the second lens element 620 and the third lens element 630 is T23, an axial distance between the third lens element 630 and the fourth lens element 640 is T34, T34>T12, and T34>T23.

The IR-cut filter 650 is made of plastic and located between the fourth lens element 640 and the image plane 660, and will not affect the focal length of the optical lens system.

The detailed optical data of the 6th embodiment are shown in Table 11 and the aspheric surface data are shown in Table 12 below.

TABLE 11

6th Embodiment
f = 5.57 mm, Fno = 2.55, HFOV = 30.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | -0.374 | | | | |
| 2 | Lens 1 | 1.776 | ASP | 0.892 | Glass | 1.535 | 62.9 | 4.10 |
| 3 | | 7.708 | ASP | 0.698 | | | | |
| 4 | Lens 2 | -1.729 | ASP | 0.536 | Plastic | 1.619 | 23.5 | -439.44 |
| 5 | | -1.946 | ASP | 0.337 | | | | |
| 6 | Lens 3 | -1.675 | ASP | 0.608 | Plastic | 1.569 | 30.2 | 11.78 |
| 7 | | -1.516 | ASP | 1.110 | | | | |
| 8 | Lens 4 | -2.518 | ASP | 0.400 | Plastic | 1.523 | 55.8 | -5.88 |
| 9 | | -14.639 | ASP | 0.600 | | | | |
| 10 | IR-cut filter | Plano | | 0.100 | Plastic | 1.506 | 56.8 | — |
| 11 | | Plano | | 0.829 | | | | |
| 12 | Image | Plano | | — | | | | |

Note:
Reference wavelength is 860 nm (d-line).

TABLE 12

Aspheric Coefficients

| Surface # | | | | |
|---|---|---|---|---|
| | 2 | 3 | 4 | 5 |
| k = | −6.2631E−01 | −1.9971E+01 | −7.6679E−01 | −1.3880E+01 |
| A4 = | 1.9453E−02 | 5.6481E−03 | −4.6694E−03 | −1.4801E−01 |
| A6 = | −1.2720E−02 | −2.5559E−02 | 4.3540E−02 | 3.0495E−01 |
| A8 = | 3.8693E−02 | 2.9807E−02 | −1.2582E−01 | −3.3256E−01 |
| A10 = | −4.2778E−02 | −2.2725E−02 | 1.3687E−01 | 2.0962E−01 |
| A12 = | 2.4561E−02 | 4.3910E−04 | −5.8581E−02 | −6.8779E−02 |
| A14 = | −6.2831E−03 | | | 1.0620E−02 |

| Surface # | | | | |
|---|---|---|---|---|
| | 6 | 7 | 8 | 9 |
| k = | 1.5936E−01 | −7.8955E+00 | −9.5582E−01 | −1.8763E+00 |
| A4 = | 9.9860E−02 | −1.7976E−01 | 3.7947E−02 | −3.6940E−03 |
| A6 = | −2.5830E−02 | 2.0609E−01 | −3.4194E−03 | 2.9676E−03 |
| A8 = | 6.5435E−02 | −1.5744E−01 | −1.6448E−03 | −1.6018E−03 |
| A10 = | −7.9912E−02 | 9.2161E−02 | 1.9802E−04 | −3.9330E−05 |
| A12 = | 3.0144E−02 | −4.0336E−02 | 3.5200E−05 | 1.0239E−04 |
| A14 = | −2.3233E−03 | 1.0528E−02 | −4.1954E−06 | −1.8533E−05 |
| A16 = | | −1.1362E−03 | | 1.1049E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.57 | T34/f | 0.20 |
| Fno | 2.55 | R4/R3 | 1.13 |
| HFOV [deg.] | 30.1 | R5/R6 | 1.10 |
| CRA [deg.] | 27.4 | R5/R8 | 0.11 |
| CT2/CT3 | 0.88 | f3/f2 | −0.03 |
| CT4/T12 | 0.57 | |f1/f2| + |f1/f3| + |f1/f4| | 1.05 |
| T23/T34 | 0.30 | | |

7th Embodiment

Figure 7A:
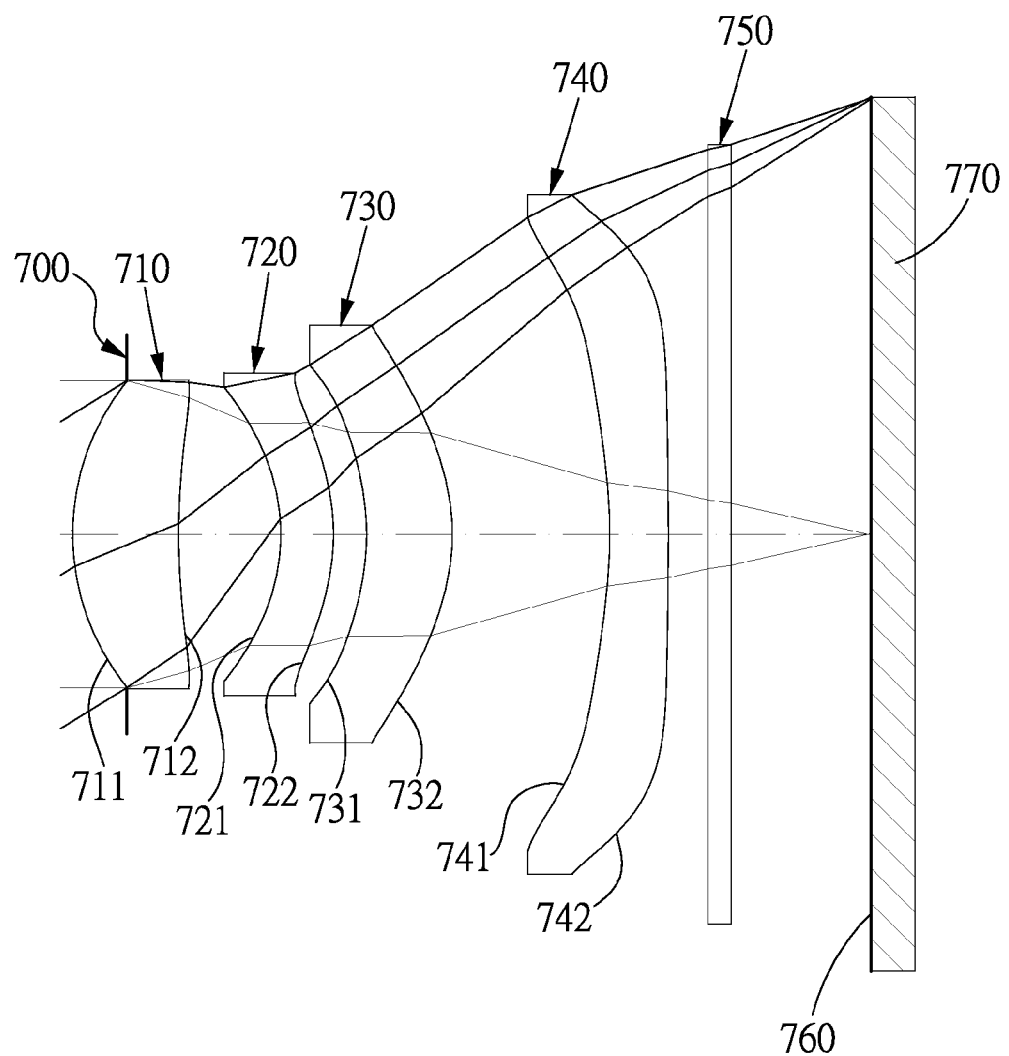
FIG. 7A is a schematic view of an imaging device according to the 7th embodiment of the present disclosure.
Figure 7B:
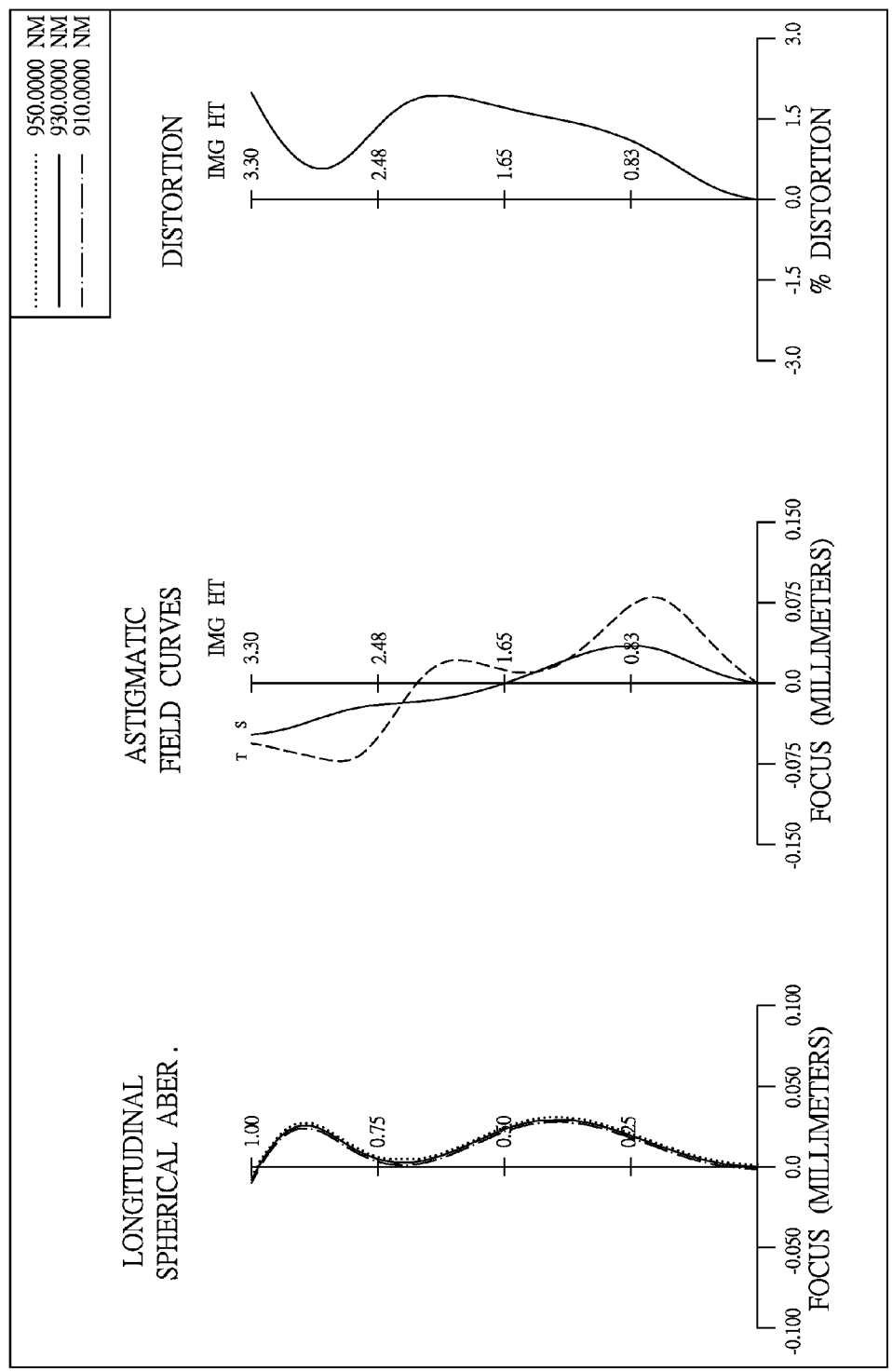
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging unit according to the 7th embodiment.

In FIG. 7A, the imaging device includes the optical lens system (not otherwise herein labeled) of the present disclosure and an image sensor 770. The optical lens system comprises, in order from an object side to an image side, a first lens element 710, an aperture stop 700, a second lens element 720, a third lens element 730, a fourth lens element 740, an IR-cut filter 750 and an image plane 760, wherein the optical lens system has a total of four non-cemented lens elements (710-740) with refractive power. The optical lens system is used in the infrared wavelength range of 930 nm. In the optical lens system according to the 7th embodiment, Abbe numbers of the second lens element 720, the third lens element 730 and the fourth lens elements 740 are smaller than 32.

The first lens element 710 with positive refractive power has an aspheric object-side surface 711 being convex in a paraxial region and an aspheric image-side surface 712 being concave in a paraxial region, and the first lens element 710 is made of plastic material.

The second lens element 720 with positive refractive power has an aspheric object-side surface 721 being concave in a paraxial region and an aspheric image-side surface 722 being convex in a paraxial region, and the second lens element 720 is made of plastic material.

The third lens element 730 with positive refractive power has an aspheric object-side surface 731 being concave in a paraxial region and an aspheric image-side surface 732 being convex in a paraxial region, and the third lens element 730 is made of plastic material.

The fourth lens element 740 with negative refractive power has an aspheric object-side surface 741 being concave in a paraxial region and an aspheric image-side surface 742 being convex in a paraxial region, the fourth lens element 740 is made of plastic material, and inflection points are formed on the object-side surface 741 and the image-side surface 742 of the fourth lens element 740.

A point P1 of a maximum effective radius position on the image-side surface 742 of the first lens element 740 which is projected on the optical axis is located nearer an imaged object than an axial vertex P2 on the object-side surface 741 of the fourth lens element 740 (referring to FIG. 9, not otherwise herein drawn).

In the optical lens system of the imaging device according to the 7th embodiment, when an axial distance between the first lens element 710 and the second lens element 720 is T12, an axial distance between the second lens element 720 and the third lens element 730 is T23, an axial distance between the third lens element 730 and the fourth lens element 740 is T34, T34>T12, and T34>T23.

The IR-cut filter 750 is made of glass and located between the fourth lens element 740 and the image plane 760, and will not affect the focal length of the optical lens system.

The detailed optical data of the 7th embodiment are shown in Table 13 and the aspheric surface data are shown in Table 14 below.

TABLE 13

7th Embodiment
f = 5.22 mm, Fno = 2.25, HFOV = 31.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.407 | | | | |
| 2 | Lens 1 | 1.870 | ASP | 0.800 | Plastic | 1.595 | 26.6 | 4.36 |
| 3 | | 5.633 | ASP | 0.771 | | | | |
| 4 | Lens 2 | −1.552 | ASP | 0.398 | Plastic | 1.595 | 26.6 | 4296.26 |
| 5 | | −1.700 | ASP | 0.250 | | | | |
| 6 | Lens 3 | −1.908 | ASP | 0.648 | Plastic | 1.595 | 26.6 | 11.01 |
| 7 | | −1.665 | ASP | 1.188 | | | | |
| 8 | Lens 4 | −4.008 | ASP | 0.443 | Plastic | 1.595 | 26.6 | −7.78 |
| 9 | | −30.850 | ASP | 0.300 | | | | |
| 10 | IR-cut filter | Plano | | 0.175 | Glass | 1.509 | 64.2 | — |
| 11 | | Plano | | 1.056 | | | | |
| 12 | Image | Plano | | — | | | | |

Note:
Reference wavelength is 930 nm (d-line).

TABLE 14

Aspheric Coefficients

| | Surface # | | | |
|---|---|---|---|---|
| | 2 | 3 | 4 | 5 |
| k = | −6.1081E−01 | −1.2258E+00 | −3.4016E−01 | −1.1025E+01 |
| A4 = | 2.0757E−02 | 7.0372E−03 | −1.0091E−02 | −1.8855E−01 |
| A6 = | −1.5310E−02 | −3.1047E−02 | 4.8981E−02 | 3.0624E−01 |
| A8 = | 3.8653E−02 | 3.1834E−02 | −1.2644E−01 | −3.3019E−01 |
| A10 = | −4.1998E−02 | −2.0416E−02 | 1.4140E−01 | 2.1035E−01 |
| A12 = | 2.4965E−02 | 7.2417E−04 | −4.9608E−02 | −6.7673E−02 |
| A14 = | −6.5382E−03 | | | 1.1830E−02 |

| | Surface # | | | |
|---|---|---|---|---|
| | 6 | 7 | 8 | 9 |
| k = | 5.6324E−01 | −8.8418E+00 | −1.3280E−01 | 7.3185E+01 |
| A4 = | 8.8365E−02 | −1.6254E−01 | 3.4785E−02 | 1.3331E−02 |
| A6 = | −3.8031E−02 | 1.8996E−01 | −4.4103E−03 | −1.1284E−02 |
| A8 = | 5.3762E−02 | −1.5739E−01 | −1.7023E−03 | 5.0760E−03 |
| A10 = | −7.2768E−02 | 9.3470E−02 | 1.9879E−04 | −1.9049E−03 |
| A12 = | 3.3513E−02 | −4.0031E−02 | 3.5864E−05 | 3.8783E−04 |
| A14 = | −3.7792E−03 | 1.0524E−02 | −3.9965E−06 | −4.0666E−05 |
| A16 = | | −1.1809E−03 | | 1.7818E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.22 | T34/f | 0.23 |
| Fno | 2.25 | R4/R3 | 1.10 |
| HFOV [deg.] | 31.8 | R5/R6 | 1.15 |
| CRA [deg.] | 25.4 | R5/R8 | 0.06 |
| CT2/CT3 | 0.61 | f3/f2 | 0.00 |
| CT4/T12 | 0.57 | |f1/f2| + |f1/f3| + |f1/f4| | 0.96 |
| T23/T34 | 0.21 | | |

8th Embodiment

Figure 8A:
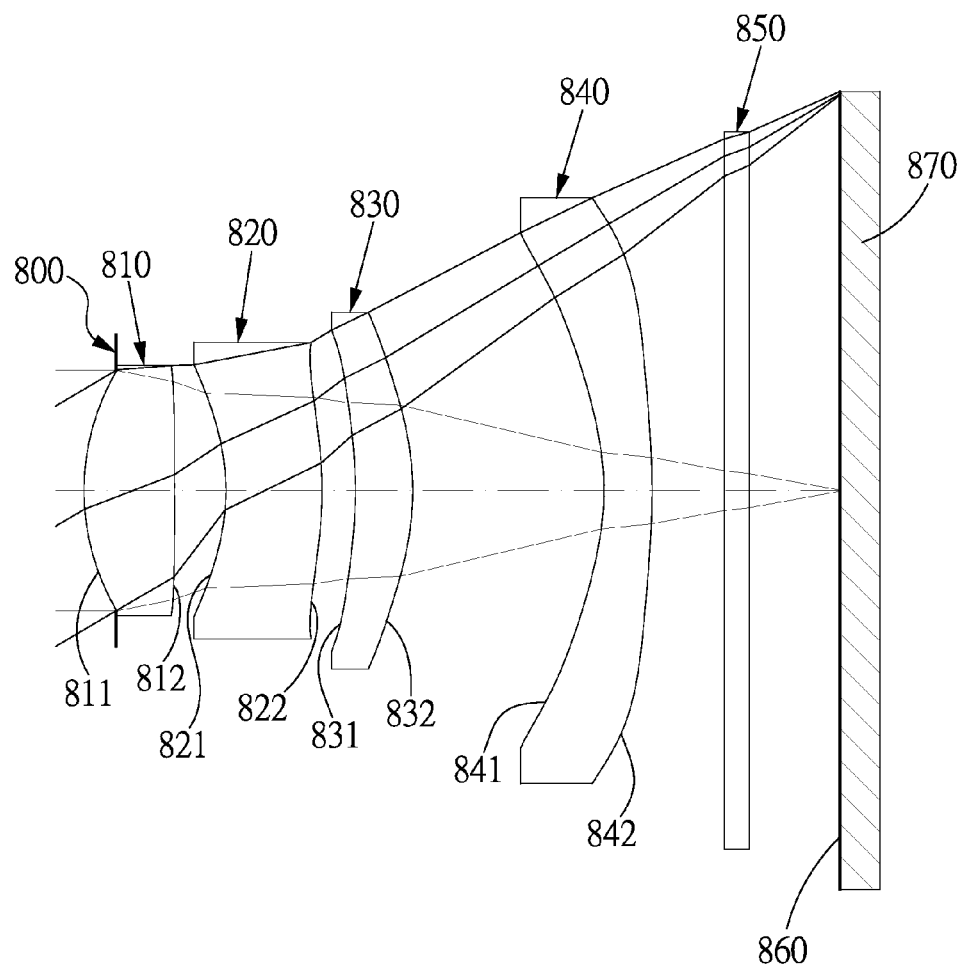
FIG. 8A is a schematic view of an imaging device according to the 8th embodiment of the present disclosure.
Figure 8B:
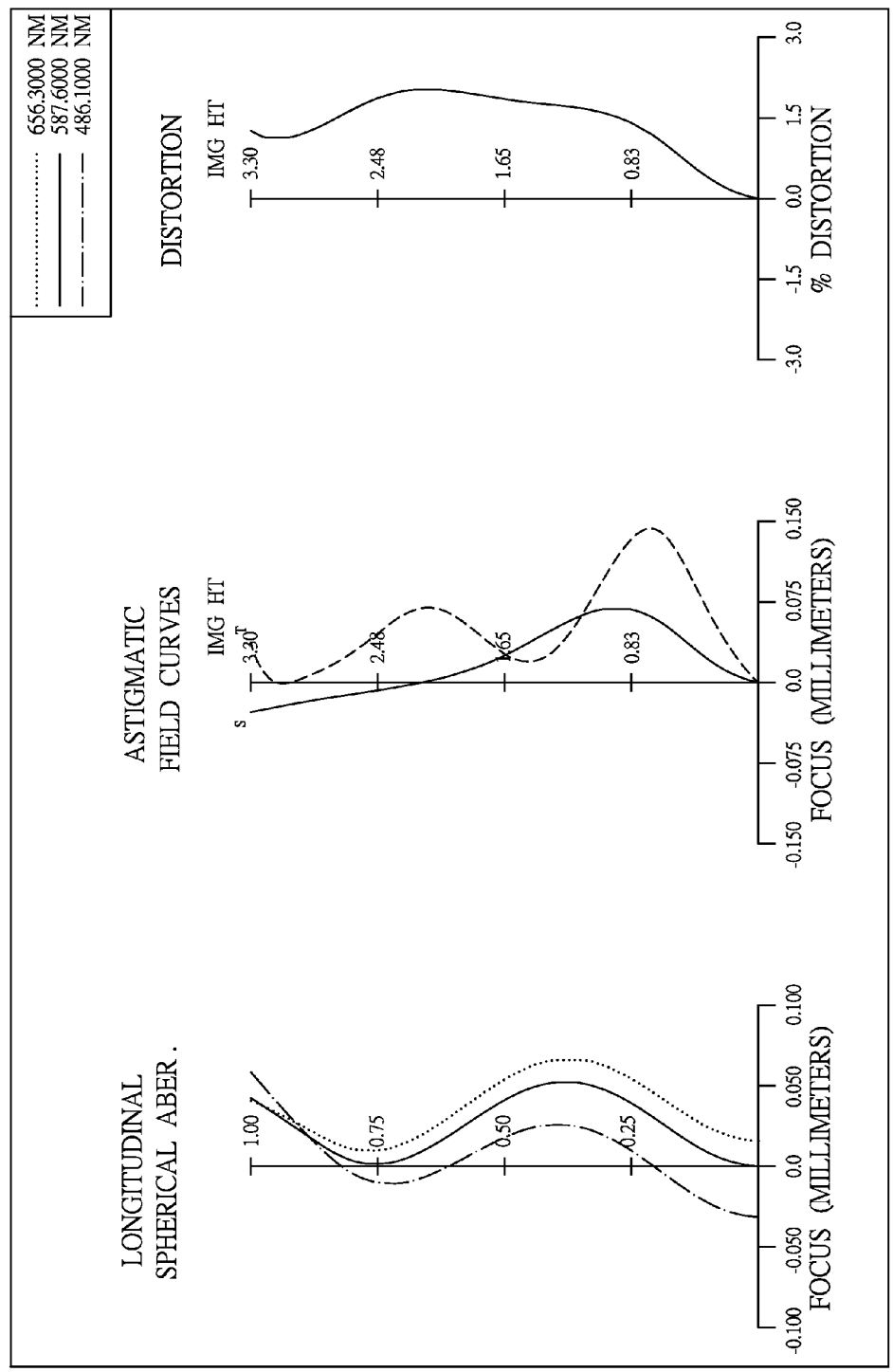
FIG. 8B shows spherical aberration curves, astigmatic field curves and a distortion curve of the imaging device according to the 8th embodiment.

FIG. 8A is a schematic view of an imaging device according to the 8th embodiment of the present disclosure. FIG. 8B shows, in order from left to right, spherical aberration curves, astigmatic field curves and a distortion curve of the imaging unit according to the 8th embodiment.

In FIG. 8A, the imaging device includes the optical lens system (not otherwise herein labeled) of the present disclosure and an image sensor 870. The optical lens system comprises, in order from an object side to an image side, a first lens element 810, an aperture stop 800, a second lens element 820, a third lens element 830, a fourth lens element 840, an IR-cut filter 850 and an image plane 860, wherein the optical lens system has a total of four non-cemented lens elements (810-840) with refractive power.

The first lens element 810 with positive refractive power has an aspheric object-side surface 811 being convex in a paraxial region and an aspheric image-side surface 812 being convex in a paraxial region, and the first lens element 810 is made of plastic material.

The second lens element 820 with negative refractive power has an aspheric object-side surface 821 being concave in a paraxial region and an aspheric image-side surface 822 being convex in a paraxial region, and the second lens element 820 is made of plastic material.

The third lens element 830 with positive refractive power has an aspheric object-side surface 831 being concave in a paraxial region and an aspheric image-side surface 832 being convex in a paraxial region, and the third lens element 830 is made of plastic material.

The fourth lens element 840 with negative refractive power has an aspheric object-side surface 841 being concave in a paraxial region and an aspheric image-side surface 842 being convex in a paraxial region, the fourth lens element 840 is made of plastic material, and inflection points are formed on the object-side surface 841 and the image-side surface 842 of the fourth lens element 840.

A point P1 of a maximum effective radius position on the image-side surface 842 of the first lens element 840 which is projected on the optical axis is located nearer an imaged object than an axial vertex P2 on the object-side surface 841 of the fourth lens element 840 (referring to FIG. 9, not otherwise herein drawn).

In the optical lens system of the imaging device according to the 8th embodiment, when an axial distance between the first lens element 810 and the second lens element 820 is T12, an axial distance between the second lens element 820 and the third lens element 830 is T23, an axial distance between the third lens element 830 and the fourth lens element 840 is T34, T34>T12, and T34>T23.

The IR-cut filter 850 is made of glass and located between the fourth lens element 840 and the image plane 860, and will not affect the focal length of the optical lens system.

The detailed optical data of the 8th embodiment are shown in Table 15 and the aspheric surface data are shown in Table 16 below.

TABLE 15

8th Embodiment
f = 5.51 mm, Fno = 2.75, HFOV = 30.6 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.265 |  |  |  |  |
| 2 | Lens 1 | 2.001 | ASP | 0.753 | Plastic | 1.544 | 55.9 | 3.61 |
| 3 |  | −96.019 | ASP | 0.428 |  |  |  |  |
| 4 | Lens 2 | −1.825 | ASP | 0.801 | Plastic | 1.639 | 23.5 | −9.33 |
| 5 |  | −3.080 | ASP | 0.276 |  |  |  |  |
| 6 | Lens 3 | −3.869 | ASP | 0.478 | Plastic | 1.544 | 55.9 | 9.59 |
| 7 |  | −2.319 | ASP | 1.591 |  |  |  |  |
| 8 | Lens 4 | −2.347 | ASP | 0.400 | Plastic | 1.535 | 55.7 | −7.36 |
| 9 |  | −6.151 | ASP | 0.600 |  |  |  |  |
| 10 | IR-cut filter | Plano |  | 0.210 | Glass | 1.517 | 64.2 | — |
| 11 |  | Plano |  | 0.752 |  |  |  |  |
| 12 | Image | Plano |  | — |  |  |  |  |

Note:
Reference wavelength is 587.6 nm (d-line).

TABLE 16

Aspheric Coefficients

| | Surface # | | | |
|---|---|---|---|---|
| | 2 | 3 | 4 | 5 |
| k = | −6.9427E−01 | −9.0000E+01 | −1.8989E+00 | −5.0430E+01 |
| A4 = | 1.8853E−02 | −9.3082E−04 | 1.4265E−02 | −1.1464E−01 |
| A6 = | −1.5468E−02 | −1.9205E−02 | 4.2850E−02 | 2.9447E−01 |
| A8 = | 3.8561E−02 | 2.4851E−02 | −1.3174E−01 | −3.3670E−01 |
| A10 = | −4.2465E−02 | −2.6716E−02 | 1.2990E−01 | 2.0978E−01 |
| A12 = | 2.4286E−02 | 5.9370E−03 | −4.3028E−02 | −6.8243E−02 |
| A14 = | −7.6179E−03 |  |  | 1.0686E−02 |

| | Surface # | | | |
|---|---|---|---|---|
| | 6 | 7 | 8 | 9 |
| k = | 1.0646E+00 | −2.1726E+01 | −9.0865E−01 | −9.0000E+01 |
| A4 = | 3.3849E−02 | −1.6365E−01 | 3.7442E−02 | −2.0093E−03 |
| A6 = | −2.0919E−02 | 2.0411E−01 | −3.4464E−03 | 3.0644E−03 |
| A8 = | 6.9429E−02 | −1.5737E−01 | −1.6429E−03 | −1.5911E−03 |
| A10 = | −8.0264E−02 | 9.2150E−02 | 2.0057E−04 | −3.7967E−05 |
| A12 = | 2.9233E−02 | −4.0418E−02 | 3.6184E−05 | 1.0256E−04 |
| A14 = | −2.5733E−03 | 1.0495E−02 | −3.9140E−06 | −1.8508E−05 |
| A16 = |  | −1.1208E−03 |  | 1.1090E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.51 | T34/f | 0.29 |
| Fno | 2.75 | R4/R3 | 1.69 |
| HFOV [deg.] | 30.6 | R5/R6 | 1.67 |
| CRA [deg.] | 30.5 | R5/R8 | 0.63 |
| CT2/CT3 | 1.68 | f3/f2 | −1.03 |
| CT4/T12 | 0.93 | |f1/f2| + |f1/f3| + |f1/f4| | 1.25 |
| T23/T34 | 0.17 | | |

9th Embodiment

FIG. 10 is a schematic view of an electronic device 10 according to the 9th embodiment of the present disclosure. The electronic device 10 of the 9th embodiment is a smart TV, wherein the electronic device 10 includes an imaging device 11. The imaging device 11 includes an optical lens system (not otherwise herein labeled) according to the present disclosure and an image sensor (not otherwise herein labeled), wherein the image sensor is disposed on or near an image plane of the optical lens system.

10th Embodiment

FIG. 11 is a schematic view of an electronic device 20 according to the 10th embodiment of the present disclosure. The electronic device 20 of the 10th embodiment is a wireless monitoring device, wherein the electronic device 20 includes an imaging device 11. The imaging device 11 includes an optical lens system (not otherwise herein labeled) according to the present disclosure and an image sensor (not otherwise herein labeled), wherein the image sensor is disposed on or near an image plane of the optical lens system.

11th Embodiment

FIG. 12 is a schematic view of an electronic device 30 according to the 11th embodiment of the present disclosure. The electronic device 30 of the 11th embodiment is a motion sensing input device, wherein the electronic device 30 includes an imaging device 11. The imaging device 11 includes an optical lens system (not otherwise herein labeled) according to the present disclosure and an image sensor (not otherwise herein labeled), wherein the image sensor is disposed on or near an image plane of the optical lens system.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens system comprising, in order from an object side to an image side:
   a first lens element with positive refractive power having an object-side surface being convex in a paraxial region thereof;
   a second lens element having an image-side surface being convex in a paraxial region thereof;
   a third lens element with positive refractive power having an object-side surface being concave in a paraxial region thereof and an image-side surface being convex in a paraxial region thereof, both of the object-side surface and the image-side surface of the third lens element being aspheric; and
   a fourth lens element having an object-side surface being concave in a paraxial region thereof and an image-side surface being convex in a paraxial region thereof, both of the object-side surface and the image-side surface of the fourth lens element being aspheric;
   wherein the optical lens system has a total of four non-cemented lens elements a focal length of the first lens element is f1, a focal length of the second lens element is f2, a focal length of the third lens element is f3, a focal length of the fourth lens element is f4, a curvature radius of the object-side surface of the third lens element is R5, a curvature radius of the image-side surface of the third lens element is R6, and the following conditions are satisfied:

$|f1/f2|+|f1/f3|+|f1/f4|<1.80$; and $0<R5/R6<20$.

2. The optical lens system of claim 1, wherein a curvature radius of an object-side surface of the second lens element is R3, a curvature radius of the image-side surface of the second lens element is R4, and the following condition is satisfied:

$R4/R3<2.0$.

3. The optical lens system of claim 1, wherein a central thickness of the fourth lens element is CT4, an axial distance between the first lens element and the second lens element is T12, and the following condition is satisfied:

$CT4/T12<1.0$.

4. The optical lens system of claim 1, wherein the focal length of the first lens element is f1, the focal length of the second lens element is f2, the focal length of the third lens element is f3, the focal length of the fourth lens element is f4, and the following condition is satisfied:

$0.50<|f1/f2|+|f1/f3|+|f1/f4|<1.50$.

5. The optical lens system of claim 1, wherein the second lens element has positive refractive power.

6. The optical lens system of claim 1, wherein the curvature radius of the object-side surface of the third lens element is R5, a curvature radius of the image-side surface of the fourth lens element is R8, and the following condition is satisfied:

$0<R5/R8<4.0$.

7. The optical lens system of claim 1, wherein the fourth lens element has negative refractive power, and one of the object-side and image-side surfaces of the fourth lens element has at least one inflection point.

8. The optical lens system of claim 1, wherein an axial distance between the first lens element and the second lens element is T12, an axial distance between the second lens element and the third lens element is T23, an axial distance between the third lens element and the fourth lens element is T34, and the following conditions are satisfied:

$T34 > T12;$ $T34 > T23.$

9. The optical lens system of claim 1, wherein the optical lens system is used in infrared wavelength range of 750 nm~1050 nm.

10. The optical lens system of claim 1, wherein an axial distance between the third lens element and the fourth lens element is T34, a focal length of the optical lens system is f, and the following condition is satisfied:

$0.10 < T34/f < 0.40.$

11. The optical lens system of claim 1, wherein an axial distance between the second lens element and the third lens element is T23, an axial distance between the third lens element and the fourth lens element is T34, and the following condition is satisfied:

$T23/T34 < 5.0.$

12. The optical lens system of claim 1, wherein a central thickness of the second lens element is CT2, a central thickness of the third lens element is CT3, and the following condition is satisfied:

$0.8 < CT2/CT3 < 2.0.$

13. The optical lens system of claim 1, wherein the focal length of the second lens element is f2, the focal length of the third lens element is f3, and the following condition is satisfied:

$-1.0 < f3/f2 < 0.6.$

14. The optical lens system of claim 13, wherein the focal length of the second lens element is f2, the focal length of the third lens element is f3, and the following condition is satisfied:

$-0.7 < f3/f2 < 0.$

15. The optical lens system of claim 1, wherein Abbe numbers of at least two of the first, second, third and fourth lens elements are smaller than 32.

16. The optical lens system of claim 1, wherein an incident angle between a chief ray and a normal line on an image plane at a maximum image height is CRA, and the following condition is satisfied:

$CRA < 27.5$ degrees.

17. The optical lens system of claim 1, wherein an axial point projected from a maximum effective radius position on the image-side surface of the fourth lens element is closer to the object side than an axial vertex on the object-side surface of the fourth lens element.

18. An imaging device, comprising:
the optical lens system of claim 1; and
an image sensor, wherein the image sensor is disposed on an image plane of the optical lens system.

19. An electronic device, comprising:
the imaging device of claim 18.

* * * * *